(12) United States Patent
Bishop

(10) Patent No.: US 9,398,069 B2
(45) Date of Patent: Jul. 19, 2016

(54) STATELESS MICROKERNEL WEB SERVER ARCHITECTURE

(71) Applicant: Elastic Path Software, Inc., Vancouver (CA)

(72) Inventor: Matthew D. Bishop, North Vancouver (CA)

(73) Assignee: Elastic Path Software, Inc., Vancouver (CA)

( * ) Notice: Subject to any disclaimer, the term of this patent is extended or adjusted under 35 U.S.C. 154(b) by 92 days.

(21) Appl. No.: 14/535,233

(22) Filed: Nov. 6, 2014

(65) Prior Publication Data

US 2015/0134734 A1 May 14, 2015

Related U.S. Application Data

(60) Provisional application No. 61/902,011, filed on Nov. 8, 2013.

(51) Int. Cl.
*G06F 15/16* (2006.01)
*H04L 29/08* (2006.01)

(52) U.S. Cl.
CPC ............. *H04L 67/02* (2013.01); *H04L 67/303* (2013.01)

(58) Field of Classification Search
CPC .............................. H04L 67/02; H04L 67/303
USPC ....................................................... 709/203
See application file for complete search history.

(56) References Cited

U.S. PATENT DOCUMENTS

| | | | | |
|---|---|---|---|---|
| 6,996,828 B1* | 2/2006 | Kimura | ............... | G06F 9/45537 718/102 |
| 2004/0205149 A1* | 10/2004 | Dillon | ............... | G06F 17/30902 709/217 |
| 2005/0044242 A1* | 2/2005 | Stevens | ............. | G06F 17/30902 709/228 |
| 2006/0015401 A1* | 1/2006 | Chu | ....................... | G06Q 30/02 705/301 |
| 2008/0195712 A1* | 8/2008 | Lin | ........................ | G06F 3/0486 709/206 |
| 2009/0249194 A1* | 10/2009 | Day | .................. | G06F 17/30905 715/239 |

* cited by examiner

*Primary Examiner* — Tauqir Hussain
(74) *Attorney, Agent, or Firm* — Alleman Hall McCoy Russell & Tuttle LLP

(57) ABSTRACT

A method for serving enterprise commerce between a stateless microkernel architecture HTTP server program executed on a server device and an HTTP client program executed on a client computing device is disclosed. The method includes receiving an HTTP request including a plurality of client attributes and a plurality of resource operations from an HTTP client program, reading the plurality of client attributes from the HTTP request, and splitting the HTTP request into a plurality of individual resource operations at a splitter/combiner agent. For each individual resource operation, the method includes determining a destination URL and content type from a content type header of the HTTP request, comparing the client attributes to stored client attribute profiles, retrieving matching existing resource representations, sending the retrieved existing resource representation to the splitter/combiner agent, combining retrieved resource representations into a combined resource representation, and sending the combine resource representation to the HTTP client program.

20 Claims, 19 Drawing Sheets

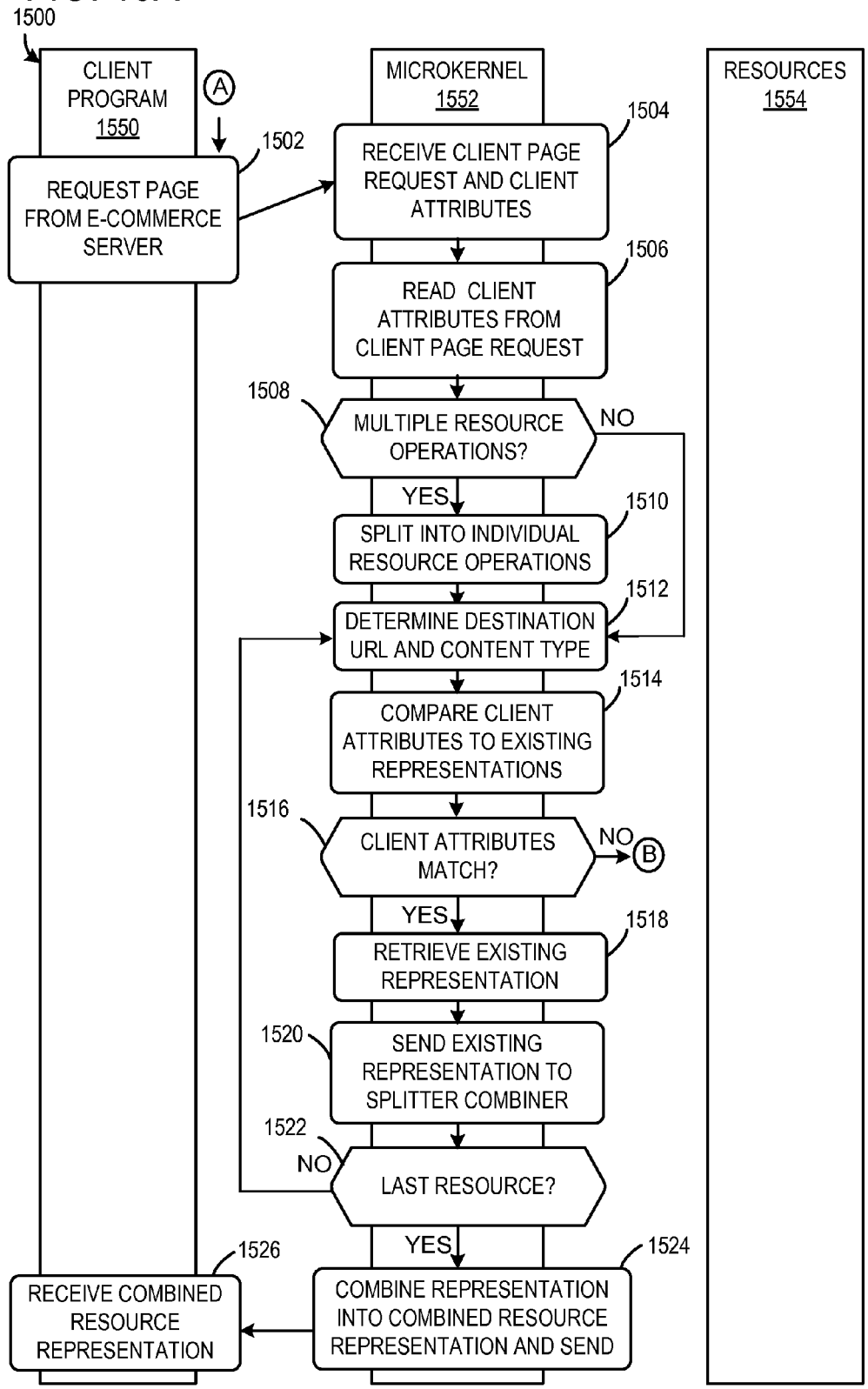

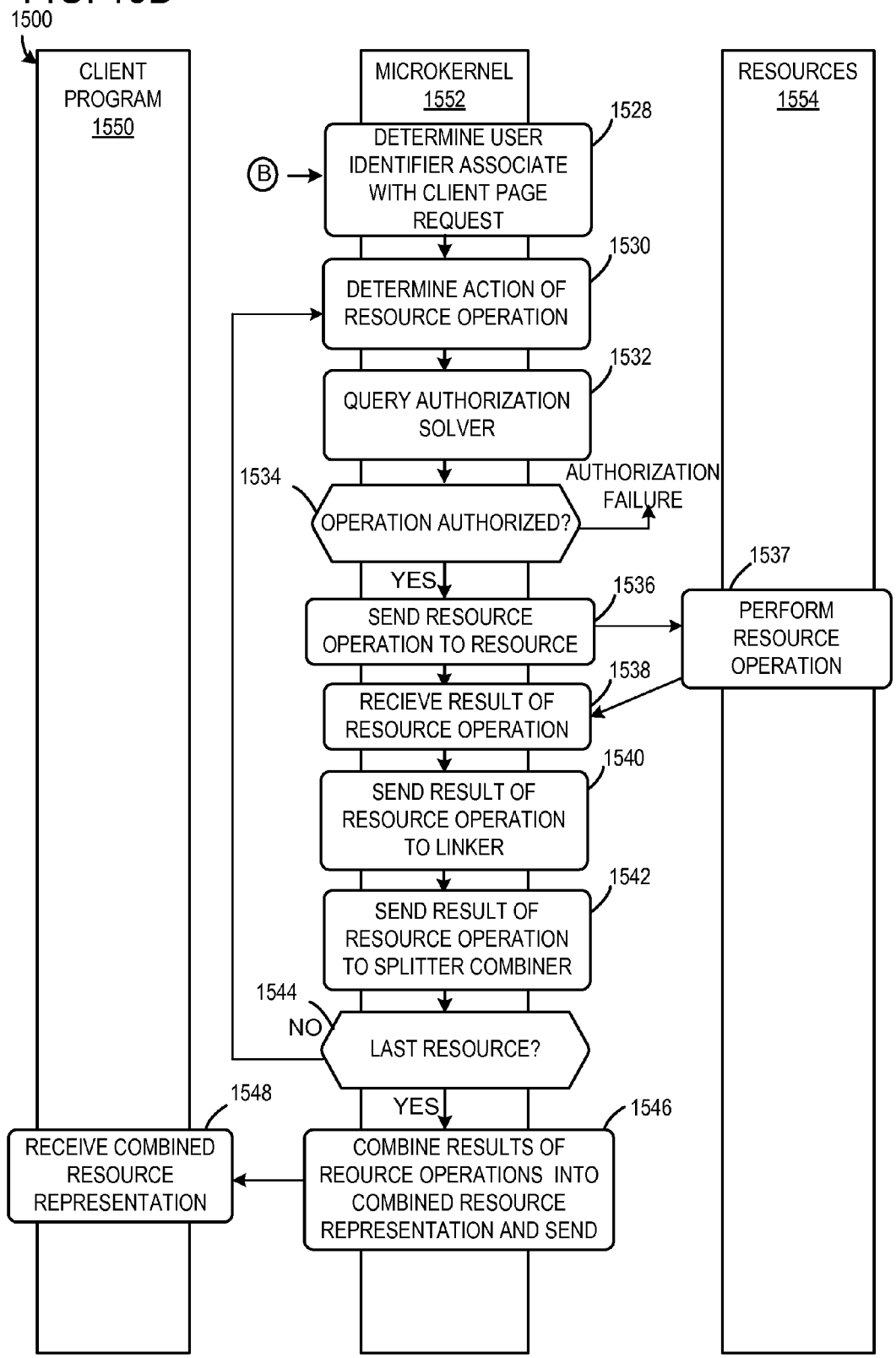

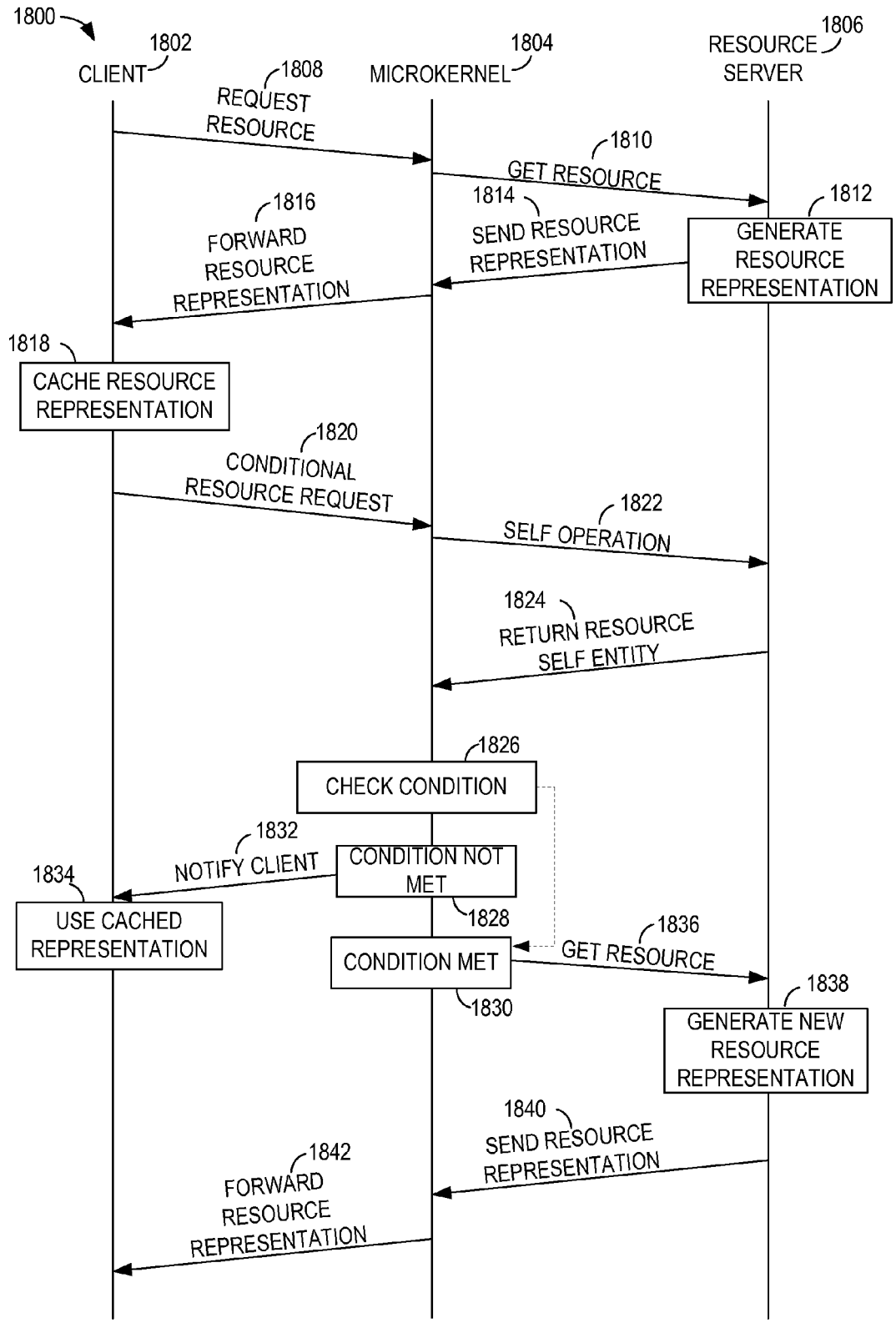

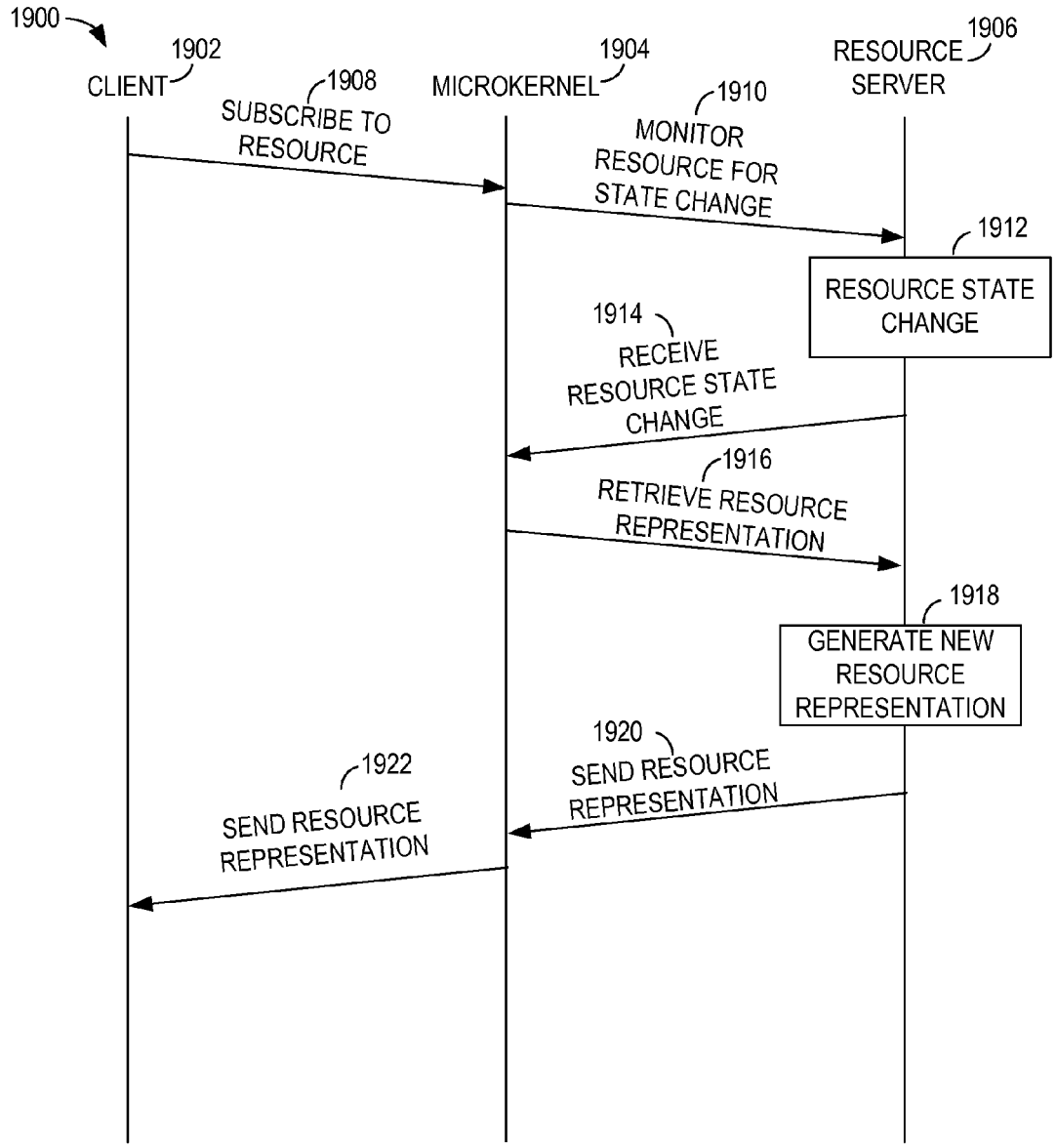

STATELESS MICROKERNEL WEB SERVER ARCHITECTURE

CROSS-REFERENCE TO RELATED APPLICATIONS

This application claims the benefit of U.S. Provisional Patent Application No. 61/902,011, filed Nov. 8, 2013, and entitled "Stateless Microkernel Web Server Architecture", the complete contents of which are hereby incorporated herein by reference for all purposes.

BACKGROUND

Ensuring a positive customer experience is important for growth in electronic commerce. As such greater emphasis is being placed on designing electronic commerce systems that are personalized to a customer and easily navigable. Conventional e-commerce sites have created various methods to maximize the customers experience encompassing requiring user registration to specialized system architectures.

Representing the state of user sessions of client-server interactions is a challenging task, and conventional client-server systems represent state using a variety of software architectures. For example, some systems may save session state in a cookie on the client, while other systems may save the state in a data file on the server or utilize server sessions to track state. Yet other systems may communicate state through the networked resources themselves.

One example of the latter approach is the HATEOAS (Hypermedia as the Engine of Application State) REST (Representational State Transfer) style of software architecture. The REST architecture is a style of software architecture utilized by distributed hypermedia systems, such as the World Wide Web (WWW), that attempts to represent application state over a computer network via linked hypermedia. Software systems that comply with the principles of REST architecture are client-server based, stateless, layered, cacheable, optionally utilize on-demand code, and maintain a unified interface between the clients and servers.

HATEOAS is a constraint of the REST architecture that specifies all interaction between client(s) and server(s) is accomplished through hypermedia dynamically provided by the server(s). In principle, interactions utilizing such an approach may not require an intermediary session state (i.e., state may be completely represented in the hypermedia itself). A typical HATEOAS system is composed of discrete resources (objects), each of which has a consistent address (e.g., Uniform Resource Location "URL") that can be accessed by a requesting client over a computer network, such as the Internet. Each individual resource also has a consistent representation, which is indicated by a MIME (Multipurpose Internet Mail Extensions) type defined via the HTTP 'Content-Type' header for the resource. The representations can be encoded and transmitted between the server and client in any suitable format, such as JSON and XML, for example.

Resources of a typical HATEOAS system are inter-related via relationships that are defined exclusively by links embedded in the data object which is a representation of each resource. In other words, as a HATEOS system is "stateless" in principle, the state of the system is contained in the resources themselves and the links between resources. Each link includes a "REL" field defining the name of the relationship to the other resource and a "HREF" field defining the address (e.g., URL) to the other resource. During client-server interactions, a HATEOAS system provides four actions on resources: GET, POST, PUT, and DELETE.

In practice, the REST HATEOAS architectural style has numerous deficiencies, which the present invention has been conceived to address. For example, in the REST HATEOAS architecture, additional information is included within the HTTP header, thus tying a typical HATEOAS system to the HTTP protocol itself. Such a configuration may therefore render the typical system unusable with protocols other than HTTP. To address this deficiency, the embodiments disclosed herein remove the HTTP protocol and provide the semantics in a more neutral manner, thereby allowing for client-server interaction across a variety of protocols, if desired. Nonetheless, the HTTP protocol may be one of the protocols, among others, used to engage a system in accordance with embodiments of the present disclosure.

A second deficiency of the REST HATEOAS architecture arises once the objects are separated from their HTTP receiver endpoint. Specifically, the objects lose the content type and URL identity, and therefore this information must be provided via other mechanism(s). Thus, the disclosed embodiments embed this information in a data structure, referred to as the "self entity," of the object itself.

A third deficiency of the REST HATEOAS architecture is that the 'Content-Type' headers must transmit two distinct pieces of information: the type of the object and the encoding method. In typical systems, these two pieces of information may be concatenated with a "+" symbol within the HTTP header string. However, this practice obfuscates both pieces of information, and potentially makes processing of incoming requests from clients difficult and/or error-prone. Accordingly, the disclosed embodiments move the MIME type of the object into the above-mentioned self entity, and preserve the 'Content-Type' HTTP header for the purpose of expressing the object encoding method, such as JSON, XML, etc.

A fourth deficiency of the REST HATEOAS architecture is that a URL of a resource is a poor identifier in a complex, highly scaled web server implementation. For example, once a client accesses the system on one server, all the links in the representations are typically configured to point to the same server instance, thus "sticking" that client to that server instance. Thus, in practice, a scaled deployment utilizing a pool of servers must rely on a single entry point, such as a server load balancer, that routes request(s) from requesting client(s) to a particular server within the pool of servers. The servers in the pool must know the name of this entry point and construct their URLs to point to this entry point explicitly. Furthermore, the object itself is highly inflexible and breakable as its URL points to a hard server entry point. For example, as the pool of available servers decreases as one or more severs become unavailable, URL reference(s) to the unavailable server(s) are lost. As another example, as the pool of available servers increases, the clients that are stuck to particular server instances may not be able to utilize the additional computing resources, thereby leading to unbalanced server loading.

More importantly, by combining the server location and the URI of the resource together to form the URL, a typical system breaks a central REST tenet, namely, statelessness. The disclosed embodiments address these issues by separating the identity of the object from the server that provided the object. This identity, referred to as the URI, is stored in the above-described "self" entity and can be used to address the same logical resource on one or more other server instances.

As a fifth deficiency, the REST HATEOAS architecture has no concept of the user performing operations, and instead assumes completely anonymous interactions. Such a configuration is woefully impractical in most modern systems (e.g., e-commerce systems) where user authorization and/or authentication are required to consume resources and execute transactions. The disclosed embodiments address this issue by introducing the concept of a "resource operation," (e.g., action to be performed on a resource) and defining an "authorization server" to determine whether a requesting user is authorized to perform a given resource operation. Accordingly, all resource operations must provide a user identifier indicating the identity of the requesting user. The identity of the user may be an anonymous identifier, a user role identifier, or other identifier which does indicate personally identifiable information. Such a configuration may therefore allow the user to access resources that are dedicated exclusively to the user and/or to access resources that are dedicated to a particular "role" shared by the user and one or more other users.

A sixth deficiency of the REST HATEOAS architecture is that it is difficult to develop systems that utilize servers that communicate asynchronously with runtime executable programs on the client, in a REST HATEOAS compliant manner, since much of the information about the resources being downloaded via HTTP is contained in HTTP headers that are not easily accessible to the runtime executable programs.

A seventh deficiency is centered on the 'State' part of REST. The State of the system is transferred between the client and the server (the T part of REST), but only at the request of the client. The server has no mechanism to communicate the current state without the client calling for it. This leads to the problem of State Mismatch, where the client's perception of the system state is different from the server. This leaves the client to make incorrect decisions based on old state. It also leaves the client only one choice to mitigate the problem, which is to refresh the state as often as they can.

REST currently follows the Client-Server architecture characterized by the flow of control. The Client initiates a call to the Server, which processes the request. The Server formulates a response and sends it back to the Client. The Client processes the response and then may issue follow-on requests.

A variation on this is the "asynchronous" call-response architecture, where the client initiates a request but does not wait for a response. Instead, the server calls the client back when a response is ready for consumption. The advantage of this model is that the client does not have to block, waiting for the server to respond. A disadvantage is that the client has to keep track of which response belongs to which request.

As an eighth deficiency, the REST HATEOAS electronic commerce platform involves integration of third party business commerce systems with the existing business API. In the REST HATEOAS, the commerce process is generalized into resources, relationships, and workflows. This generalization defines the Business API.

Integration of the electronic commerce platform with third party commerce platforms presents problems of compatibility between each systems API definitions and operations. This compatibility issue requires modification of the API code in order to ensure proper integration of respective platforms. This deficiency can rapidly compound in the event that a commerce platform must be integrated with multiple third party platforms and thus require significant changes to the core electronic commerce platform to integrate and resolve any potential conflict between the electronic commerce platform and each third party commerce platform.

Lastly, the Business API must not only be constructed to be fully integrated with any and all third party commerce platforms, but it also must also clearly project the capabilities and data of the business to the consumer. The process of conveying the business to consumers can be a complex process involving software developers, website planners, and ultimately the business leadership. Accordingly, the potential for additional costs and time to market incurred in the planning, development, and implementation of the commerce platform primarily exist in the communication and interactions between each level of the design and development process.

SUMMARY

A method for serving enterprise commerce between a stateless microkernel architecture HTTP server program executed on a server device and an HTTP client program executed on a client computing device is disclosed. Upon receiving an HTTP request including plurality of client attributes and a plurality of resource operations from an HTTP client program via a computer network, the HTTP server program may read the plurality of client attributes from the HTTP request and split at a splitter/combiner agent the HTTP request into a plurality of individual resource operations. For each resource operation, the HTTP server program may determine a destination URL and a content type at the destination URL from a content type header of the HTTP request. The HTTP server program may also compare the client attributes to a stored client attribute profile, and retrieve an existing resource representation matching the plurality of client attributes from each resource. The retrieved resource representations may be sent to the splitter/combiner agent and combined into a combined resource representation. The HTTP server program may send the combined resource representation to the HTTP client program.

BRIEF DESCRIPTION OF THE DRAWINGS

FIGS. 15A and 15B show a process flow depicting an embodiment of a method for retrieving an accurate representation of a resource.

FIG. 18 shows a process flow illustrating a method of cache control by a REST HATEOAS microkernel in accordance with an embodiment of the present disclosure.

FIG. 19 shows a process flow illustrating operation of a publish/subscribe agent in accordance with an embodiment of the present disclosure.

DETAILED DESCRIPTION

Figure 1:
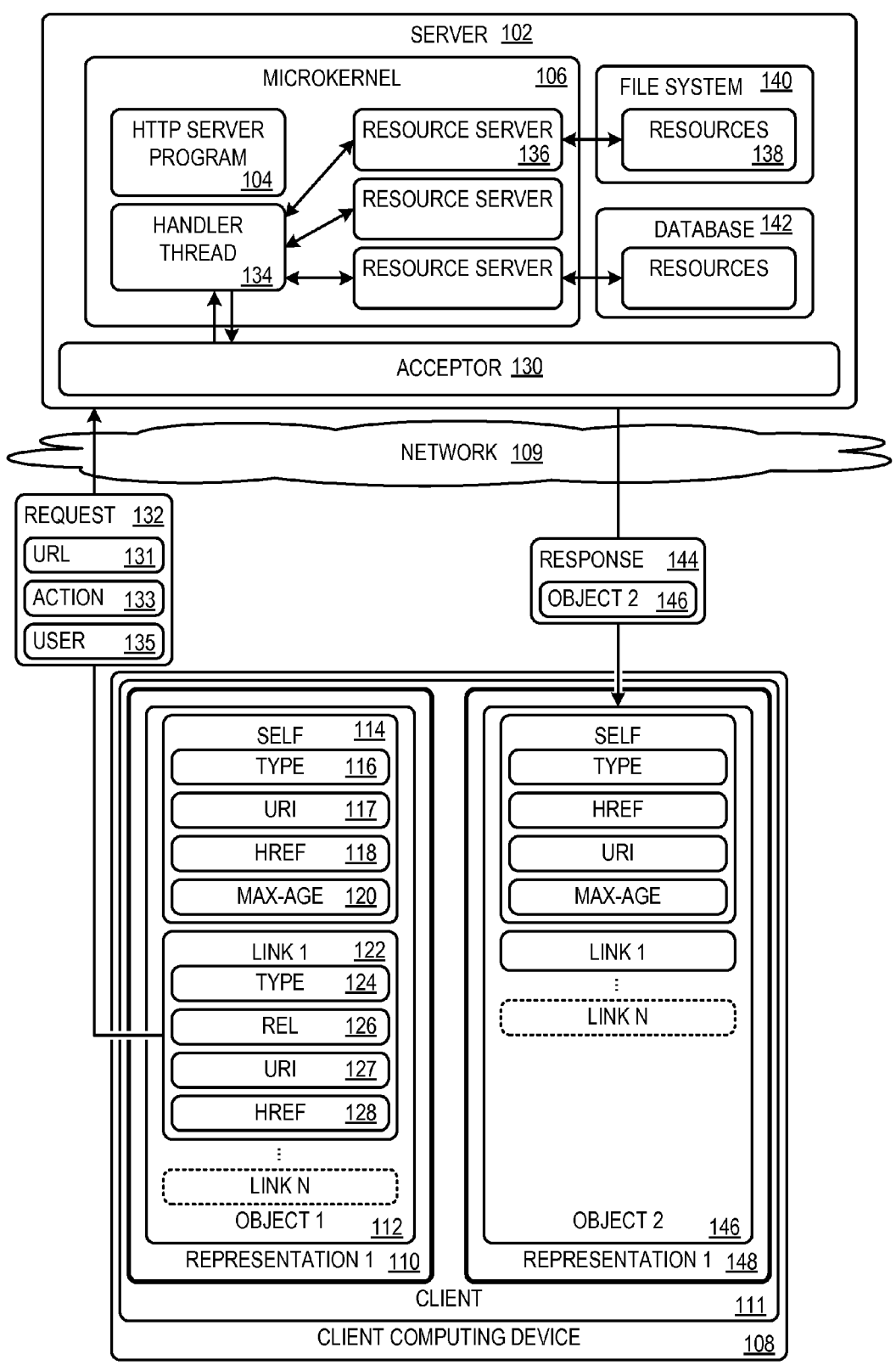
FIG. 1 shows a non-limiting example of a resource in accordance with an embodiment of the present disclosure.

From the preceding discussion, it will be appreciated that HATEOAS is a constraint of the REST architecture that specifies all interaction between client(s) and server(s) is accomplished through hypermedia dynamically provided by the servers. REST systems are "stateless" in that each request from a client to a server contains all information necessary to interpret the request. This approach allows for a particular server to handle a request from a client regardless of whether or not that server has handled previous requests from that client.

In order to meet said constraints, each resource in a HATEOAS system is a network-addressable object accessible via a consistent Uniform Resource Locator (URL), and HATEOAS systems operate on these objects. In other words, the term "resource," as used herein, refers to a network addressable data object (hereinafter "object") that encompasses some meaningful concept. Each object includes all information necessary to understand how to interact with the corresponding resource, such as how to provide a "representation" of the resource (e.g., how to visually present the object to a user via a display device) and how to link to/from the resource. Before continuing, it will be understood that an object may "represent" a resource in that the object provides the current state of the resource, and the object may be usable by each requesting client to provide a "representation" of the object that may be dependent upon one or more characteristics of the client. In other words, as will be described in greater detail below, the same object may be usable to provide different "representations" on different clients. Put another way, a resource may be thought of as a software implementation of business logic, an object may be thought of as an encoding of that business logic, and a representation may be thought of as a manifestation of an object at the client device.

As one non-limiting example, an electronic commerce system utilizing the HATEOAS architecture may comprise a "shipping" resource to maintain shipping information, and thus to respond to requests (e.g., resource operations) for the shipping information (e.g., user account shipping information, available shipping methods, etc.). Similarly, the example e-commerce system may further comprise an "inventory" resource to maintain inventory information, a "price" resource to maintain pricing information, and a "cart" resource to maintain an online shopping cart. From this example, it will therefore be appreciated that the information provided by each resource may be related to (e.g., depend on, depend from, etc.) any one or more other resources.

A given resource may be related to one or more other resources defined by links within the object representing the resource. As one simple example, a saleable good resource may link to a current availability resource indicating the availability of a particular saleable good. As will be described in greater detail below, a HATEOAS system according to embodiments of the present disclosure provides a corresponding resource server for one or more resources, where each resource server is configured to maintain the resource and/or respond to external requests for the resource (e.g., provide links).

Continuing with the above example, the link to the cart link may subsequently be acted upon (e.g., upon actuation of a displayed "add to cart" button) in order to add the saleable good to the online shopping cart and/or to otherwise interact with the online shopping cart. In this way, state transitions are defined via the links, and one or more of the links may be acted upon in order to effect one or more of the transitions. Such a configuration therefore satisfies the central pillar of the REST architecture that all possible next-state transitions be defined within an object provided to the client.

In complex systems, e.g., e-commerce systems, factory floor systems, etc., such linking may be unduly burdensome due to the myriad of interconnected and interdependent rules, e.g. business rules, error handling, etc., which are inherent to such systems. This potential shortcoming has restrained widespread adoption of the HATEOAS architecture for typical complex systems. For example, in an e-commerce system, once a particular saleable good is recognized as out of stock, such an event may effect removal of the saleable good from an online shopping cart, provision of a request to reorder the good, changes to a product page, an increase in price to one or more related goods, provision of backorder notifications for pending transactions, and/or one or more other dependent actions. Failure to effect one or more of these dependent actions may lead to an undefined system state and/or may provide an unsatisfactory user experience. For example, if the available inventory of a particular saleable good is depleted without updating one or more affected resources, users of an e-commerce system may place an order for the saleable good without being aware that the item is out of stock.

Accordingly, typical complex systems may utilize non-HATEOAS architectures. These systems may be "exception-driven" or "error-driven" such that branching (e.g., business logic) is implemented upon occurrence of an exception/error. For example, in some embodiments, upon occurrence of an "out of stock" error/exception (e.g., upon trying to checkout with an out-of-stock product), typical systems may have to, for example: determine whether the product may still be orderable (e.g., via backorder), remove the "add to cart" button, remove the page from search results, etc. Such error-handling may be hardcoded into the client software, potentially requiring frequent updates to the client software as business rules are updated. In other embodiments, the "out of stock" error may simply be returned to the user, and the user may thus be expected to manually handle the error accordingly (e.g., remove out of stock items from cart before ordering). However, such a configuration relies heavily on the user, and may therefore provide inaccurate results and/or may otherwise degrade the user experience. As described below, the disclosed embodiments enable a client without knowledge of a complete set of business rules to present all available options to a user in a representation of the object presented to the user, and effect appropriate state transitions upon selection of an option.

It will therefore be appreciated that it may be desirable to "cluster" each of the business rules, decision logic, etc. around a corresponding resource server. In other words, the business rule(s) related to the maintenance of the "current availability" resource (e.g., reordering, out of stock notifications, etc.) may be instantiated within the logic of the "current availability" resource server. Such a configuration may therefore provide, for each resource, a single repository where logic related to the resource may be maintained. Accordingly, update(s) to the business rules, to link(s) between the resources, and or to the visual representations of the resources may potentially be updated on the server without extensive modification the client software. Furthermore, by instantiating such logic within one or more servers, and thus removing the logic from the clients, the described HATEOAS architecture may potentially allow for lighter-weight client(s) as compared to typical systems.

It will be further appreciated that by clustering the logic for a given resource with the corresponding resource server, an improved schema for linking between objects may be realized. As will be discussed in detail below, requests to a HATEOAS server for a particular object may effect collecting of link(s) related to the object and subsequent attaching the link(s) to the object before returning the object to the requesting client. As each resource server is substantially independent (i.e., does not directly interact with a resource of another resource server), it may be possible for each resource server to be queried (e.g., for links associated with a particular object) in parallel and/or for such querying to be substantially order-agnostic. Accordingly, the disclosed embodiments may potentially provide a more resilient and extensible linking schema that is suitable for implementing complex systems. Although an e-commerce system is used herein as an example of a system usable with the described improved HATEOAS REST architecture, it will be appreciated that the architecture may be utilized by any stateful process and/or any data model comprising inter-related information without departing from the scope of the present disclosure.

Turning to FIG. 1, an example of an embodiment of a HATEOAS-based client-server system 100 including server 102 configured to execute a HTTP server program 104 via microkernel 106 is illustrated. System 100 further comprises client computing device 108 configured to communicate with server 102 via network 109. Client computing device 108 may provide client 111 (e.g., web browser) so as to facilitate such communication. Client 111 may be configured, for example, to provide representation 110 of a data object 112 (hereinafter "object"). As previously mentioned, the term "representation," as used herein, refers to a specific presentation (e.g., visual, audio, etc.) of an object. It will be understood that each object may be interpreted and presented according to various features, preferences, etc. of each client 111. In other words, a representation of object 112 other than representation 110 may be provided by client(s) other than client 111.

As described above, typical HATEOAS systems rely upon the HTTP protocol implementation to provide low-level functions. Specifically, the MIME-type (also referred to as 'Content-type') component of the HTTP header may be used to define both the representation of the resource and the encoding method. Including additional information within the HTTP header may restrict use of other communication protocol(s), and/or may otherwise negatively affect operation of the system. The typical HATEOAS architecture may therefore not be able to provide the features of an e-commerce system.

Accordingly, it may be desirable to develop an architecture that is protocol-independent, and as such, object 112 includes a "self" entity 114 (e.g., data structure) comprising a plurality of characterizing data that may have otherwise been included in the HTTP header in a typical HATEOAS system. The characterizing data may include, but is not limited to, type 116, Uniform Resource Identifier "URI" 117, HREF 118, and max-age 120.

Type 116 provides a name of a data schema and may be used to define one or more characterizing features of object 112. As one non-limiting example, type 116 of a movie object may be a schema such as "application/vnd.imdb.movie" informing client 111 that the object is a movie. The schema may further indicate to the client what additional field(s), if any, to expect within object 112. For example, the "application/vnd.imdb.movie" schema may be defined to have a field called "rating" that describes the rating of the movie. Thus, upon recognizing an object being of the above-described movie object type, the client may access the "rating" field to determine the rating, if desired. In some embodiments, the additional field(s) may be provided within self entity 114 and/or elsewhere within object 112. It will be understood that the schema does not define the kinds of links to expect, which will be discussed in greater detail below, but rather defines feature(s) of the object, such as the zero or more additional field(s) in the particular object.

URI 117 may identify the resource represented by the object, whereas HREF 118 may identify the location of the resource. In other words, HREF 118 may identify how to access the resource identified by URI 117. For example, HREF 118 may comprise a location of server 102, URI 117 of the particular resource, an action to perform on the resource, and/or a protocol to provide such interaction. As one non-limiting example, URI 117 of a cart-type object of an e-commerce system may be "/store/cart/123," whereas HREF may be "https://www.mystore.com/store/cart/123."

Max-age field 120 indicates a maximum age (e.g., in seconds) from creation/download of object 112 that client 111 may display, or otherwise provide, representation 110 of object 112. Once this maximum age is surpassed, client 111 may be configured to request an updated instance of object 112 from server 102 rather than display representation 110, which is over the aging limit. For example, if a particular object 112 includes max-age field 120 of 86,400 seconds (i.e., 24 hours), client 111 may use this information to cache the object locally so as to avoid further calls to the system (e.g., READ requests) for the object for 24 hours. As mentioned above, typical HATEOAS systems provide information via the HTTP header, and max-age field 120 may constitute at least some of that information. As not all HTTP clients may be able to manage this information in the HTTP headers, typical configurations may effect unnecessary network traffic and server load. Further, by placing field 120 inside object 112, each client 111 may manage its own caching of the object.

Object 112 further comprises zero or more links 122, illustrated as an arbitrary number N links, each defining a relationship between the object and a related resource. Each link 122 may comprise, for example, "TYPE" element 124 defining the type of object returned by the link, "REL" element 126 defining the name of the relationship between object 112 and the returned object, URI element 127 identifying the resource providing the returned object, and "HREF" element 128 defining the location of the linked resource.

One non-limiting example of object 112 is an online shopping cart, as follows. Self entity 114 of the example shopping cart object includes a content type 116 of "application/vnd.elasticpath.cart" and an additional object field called "total-quantity" defined by the content type that indicates how many items are in the cart. In other words, the schema identified via content 116 may alert the receiving client to expect a "total-quantity" field.

```
{
  self: {
    type: "application/vnd.elasticpath.cart",
    href: "http://10.10.30.66/shapi/carts/rockjam/3456",
    uri: "/carts/rockjam/3456"
    max-age: 0,
  },
  total-quantity: 10,
  links: [
    {
      type: "application/vnd.elasticpath.links",
      href: "http://10.10.30.66/shapi/carts/rockjam/3456/lineitems",
      uri: "/carts/rockjam/3456/lineitems",
      rel: "lineitems",
      rev: "cart"
    },
    {
      type: "application/vnd.elasticpath.order",
      href: "http://10.10.30.66/shapi/orders/rockjam/34453",
      uri: "/orders/rockjam/34453",
      rel: "order",
      rev: "cart"
    },
    {
      type: "application/vnd.elasticpath.total",
      href: "http://10.10.30.66/shapi/totals/carts/rockjam/3456",
      uri: "/totals/carts/rockjam/3456",
      rel: "total",
      rev: "cart"
    }
  ]
}
```

In combination with self entity 114, links 122 provide all the information necessary to implement a HATEOAS system, as described above. In other words, if object 112 is instructed (e.g., via user interaction, such as "clicking," with representation 110) to perform a state transition (e.g., follow link 122), object 112 includes all information needed to access the link (e.g., how to contact server 102 in order to follow the link) and/or to manipulate the representation itself.

For example, during operation, client 111 may send resource operation request 132 corresponding to a particular link 122 in object 112 downloaded to client computing device 108. The request is defined by HREF element 128 of the particular link 122, and may include, for example, URL 131 indicating a location of the linked resource and action 133 indicating an action (e.g., PUT, GET, POST, or DELETE) to perform on the linked resource. For example, upon following an "add to cart" link, request 132 may include a request to POST an "add to cart" request to the "shopping cart" resource. In some embodiments, the request may further comprise user identifier 135, which will be discussed in greater detail below. Such a request is provided for the purpose of example, and is not intended to be limiting in any manner.

Request 132 is sent to server 102 via computer network 109, and is received at server 102 by acceptor 130 associated with microkernel 106. Acceptor 130 performs processing of request 132, and dispatches the request to an appropriate handler thread 134 of microkernel 106 for further processing.

The handler thread, in turn, calls various resource servers 136 associated with various resources 138 in order to retrieve the requested data. For example, as illustrated, resources 138 may be stored in file systems 140 and/or databases 142, or programmatically generated from data stored therein.

Based upon the processing of resource servers 136, response 144 including object 146 is generated, and is subsequently transmitted via network 109 to client computing device 108.

As with object 112, client 111 may be configured, upon receiving object 146, to provide representation 148 of object 146. Specifically, client 111 may be configured to examine type 116 and/or the "REL" element of each link included within object 146 in order to provide representation 148. For example, if client 111 identifies object 146 as a catalog entry (e.g., by examining type 116), and if an "add to cart" link is not present within the object, client 111 may be configured to provide a disabled (e.g., "grayed-out") add-to-cart button via representation 148. In other embodiments, client 111 may be configured to display no "add to cart" button. It will be understood that these scenarios are presented for the purpose of example, and are not intended to be limiting in any manner.

Interaction with representation 148 (e.g., via clicking) may effect transmission of a second resource operation request and subsequent receipt of a third object (not illustrated). It will be appreciated that such interaction may be repeated ad infinitum and/or until a desired state is reached.

Figure 2:
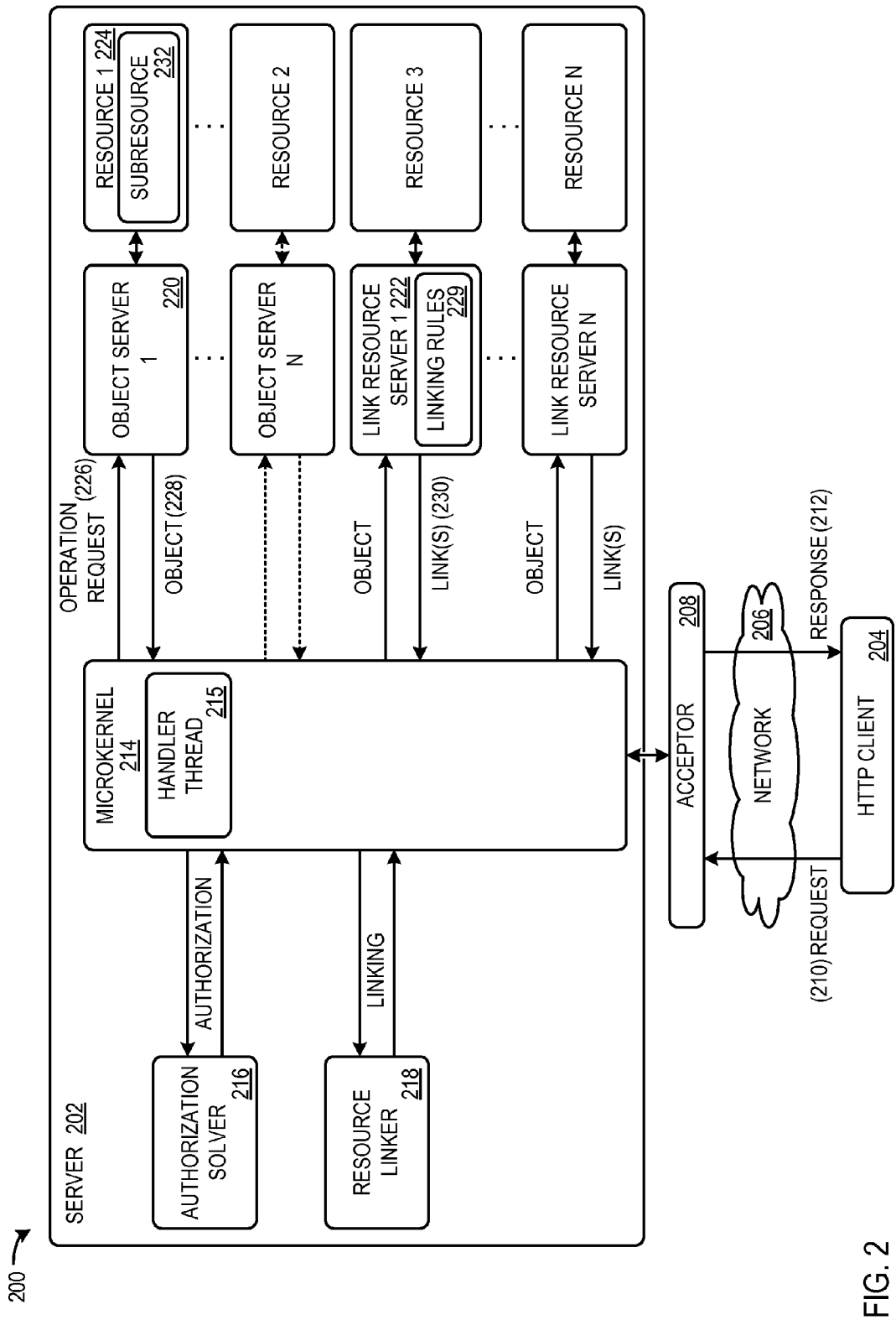
FIG. 2 shows a non-limiting example of a HATEOAS microkernel in accordance with an embodiment of the present disclosure.

Turning now to FIG. 2, a non-limiting example of a HATEOAS system 200 in accordance with another embodiment of the present disclosure is schematically illustrated. System 200 comprises server 202 communicatively coupled to HTTP client 204 via network 206. Server 202 is configured to receive, via acceptor 208, request 210 from client 204 and to send, via the acceptor, response 212. Server 202 includes microkernel 214 configured to interact with the remaining elements of the server, thereby acting as the "central communications hub" of server 202. For example, microkernel 214 may provide a handler thread 215 to handle the described request-response lifecycle. Server 202 yet further includes authorization solver 216 and resource linker 218. The resource linker may utilize the authorization solver to determine if a particular resource server is authorized to attach links, as is discussed in greater detail below.

Server 202 includes one or more object servers 220 and one or more link resource servers 222, each sometimes referred to as "resource servers." Although object servers 220 and link resource servers 222 are illustrated via an arbitrary number N of object servers and an arbitrary number N of link resource servers, respectively, it will be appreciated that such illustration is provided for ease of understanding, and that server 202 may include additional and/or different resource servers in other embodiments without departing from the scope of the present disclosure. It will be further appreciated that although object servers 220 and link resource servers 222 are illustrated as distinct components, any particular resource server may operate as an object server or a link resource server, depending on the particular request 210, as will be described in more detail below.

The object servers 220 and link resource servers 222 are distinct software programs configured to interact with each other by exchanging, i.e., sending and/or receiving, resource operations via microkernel 214. Each resource server operates independently from the others and is the only resource server that serves data objects for its resource. In other words, no resource servers other than the resource server corresponding to a particular resource 224 are able to directly interact with or modify the resource. For example, in the depicted configuration, "Object Server 1" may not directly interact with resources 224 other than "Resource 1." Such a configuration may therefore enable the implementation of business rules and/or other logic associated with a particular resource 224 within the associated resource server. In this way, each object server 220 and/or link resource server 222 is responsible for a particular resource 224 (e.g., e-commerce platform, inventory management system, data management system, database, file system, etc). For example, in an e-commerce scenario, one of the resource servers may be a "price" resource server configured to provide requested price(s), and all pricing-related logic (e.g., bulk discounts, sales, other promotions, etc.) may be implemented by the "price" resource server and only the "price" resource server.

An example request-response lifecycle of system 200 is as follows. Request 210 comprises a request to retrieve (e.g., READ) a particular resource of resources 224. Upon receiving request 210 from client 204 via acceptor 208, microkernel 214 is configured to provide the request to the resource server identified by the request. In some embodiments, microkernel 214 may be configured to parse the URI identified by the request (e.g., URI derived by acceptor 208 from URL 131) to determine the corresponding resource server. In other embodiments, microkernel 214 may be configured to determine the corresponding server via one or more other mechanism(s). As illustrated, microkernel 214 provides resource operation request 226 to "Object Server 1," and microkernel 214 receives object 228 in response. Object 228 corresponds to the resource (i.e., "Resource 1") providing the object server, and represents the state of the resource after performance of the resource operation request.

Upon receiving object 228, microkernel 214 is configured to provide the object to resource linker 218 in order to aggregate, and to subsequently attach to the object, any one or more links 230 provided by the remaining resource servers (e.g., by link resource servers 222). In other words, the resource linker is configured to collect links with additional, related information from the other resource servers.

In an example e-commerce scenario, object 228 may represent a product entry in an online catalog. For example, request 210 may comprise a request for a product information "page" for a particular product, where the "page" includes a description, price, and indication of available inventory for the product. Thus, the example object 228 received from the appropriate object server 220 comprises a catalog entry object corresponding to the product. For example, object 228 may comprise a product identifier (e.g., product ID, product title, etc.) and/or additional information such that the remaining resource servers may provide information related to the product (e.g., description, pricing, etc.).

Accordingly, once object 228 is received at resource linker 218 via microkernel 214, the resource linker is configured to provide the object to the one or more link resource servers 222 in order to populate the catalog entry through receipt, and subsequent embedding, of links 230. For example, link resource servers 222 in this scenario may include a price resource server, an inventory resource server, a product description resource server, and a shipping resource server. Each of the resource servers, upon receiving object 228 from the resource linker, may examine the object, and respond with any relevant links 230. Thus, the object may be augmented with price data returned by the price resource server, inventory data returned by the inventory server, description data returned by the product description server, and shipping information returned by the shipping resource server. Generally speaking, each link resource server 222 may implement one or more linking rules 229 (e.g., business rules, other logic, etc.) to determine which link(s) to return for a given object 228. The result of such linking, as discussed above in reference to FIG. 1, is stored within the object, and is eventually returned to the requesting client.

Although the above description pertains to so-called monolithic resources servers (e.g., shipping resource server to provide shipping information), there may be one or more subresources 232 for each of any one or more resources 224 in some embodiments. Each subresource 232 may be utilized to provide additional information to a given resource 224. Accordingly, subresources 225 may be added, deleted, or modified without any update to the associated resource, thereby potentially further increasing the extensibility of system 200. The subresources, along with the rest of the resources, are queried during linking to determine if the subresources have related information. For example, returning to the above e-commerce scenario, although the shipping resource exists to provide shipping information (e.g., shipping method selection, pricing, estimated delivery, etc.), it is each subresource that may define the individual shipping options (e.g., 3-day), etc. Thus, if a new shipping option (e.g., overnight) becomes available, a new subresource 232 can be created to define said option without updating the parent "shipping" resource. In such scenarios, after the shipping resource has handled a "shipping" resource operation, the linker may query the subresources to determine additional details.

In order to provide information related to object 228, each link resource server 222 may be configured to examine the "type" element of object 228 (e.g., TYPE 116), as more than one object encountered by a particular resource server may comprise similar, or equivalent, names (e.g., REL 126). Each resource server may implement one or more functions, and each of these functions may be defined for any one or more object types. In other words, each resource server may be configured to perform type-granular resource operations on a corresponding resource of resources 224. For example, a "shopping cart" resource server may be configured to not provide an "add to cart" link to an object of "image" type, but may be configured to provide such a link to an object of "product" type. As another example, upon encountering an object type for which no corresponding logic exists (e.g., new object type) at a particular resource server, the resource server may be configured to provide no links 230. It will be understood that, depending on the particular use case scenario and/or configuration of server 202, links 230 may include "direct" information and/or "indirect" information (e.g., information usable to programmatically retrieve other information). For example, in some embodiments, the product description resource server may be configured to provide a text-based description of the product such that the information provided in the link(s) is directly usable to provide the product description. In other embodiments where the information is "indirect," the information provided by the product description resource server may be usable by client 204, upon receipt, to programmatically retrieve the product description (e.g., from the product description resource server).

In some instances, one or more of link resource servers 222 may not be able to provide links 230, and may instead perform, in response to the query, a "default action." In some instances, such a default action may include, for example, providing an error status (e.g., "Out of stock" notification), providing a link to an error status (e.g., link to error status with up-to-date information), and/or providing nothing (e.g., no response, response with no data payload, etc.). In other instances, a resource server may provide different and/or additional default actions without departing from the scope of the present disclosure.

Generally speaking, resource linker 218 is configured to collect any information related to object 228. Accordingly, resource linker 218 may be configured to provide object 228 to every resource server of server 202. Thus, the resource linker may be configured to maintain an understanding of all of the resource servers (e.g., via a resource server list, etc.) of server 202. As mentioned previously, each resource server may be substantially independent of the other resource server(s). Therefore, linker 218 may be configured to query the resource servers in any desired order, so long as each resource server is queried. For example, in some embodiments, linker 218 may query one or more of the resource servers in parallel to increase throughput.

Regardless of the order by which the resource servers are queried, the resource server is aware that linking is complete for a particular object once all resource servers have been queried. As object 228 is passed to each resource server, and as each resource server is configured to provide information, i.e., links, independent of the information provided by the other resource server(s), it will be appreciated that the links are not embedded within the object until all link(s) have been collected from all of the resource servers. Once all the links have been collected and embedded in the object, the object is returned to the requesting client.

Although operation of resource linker 218 has been described with reference to interactions between the linker and one or more resource servers, it will be appreciated that such interaction may be provided via microkernel 214. As mentioned above, the resource servers are isolated modules configured to interact with each other by exchanging (e.g., sending and/or receiving) resource operations via microkernel 214. Accordingly, in order to query a particular resource server, linker 218 may be configured to provide a query resource operation (e.g., READ operation) for the particular resource server to the microkernel, and the microkernel may subsequently provide the query to the corresponding resource server. Similarly, the link(s) provided by the resource server may be received by linker 218 via microkernel 214.

As mentioned above, HATEOAS systems are, by design, typically unaware of the concept of "users," and may therefore be ill-suited for e-commerce scenarios and/or for other applications utilizing user-based permissions, preferences, etc. Accordingly, server 200 further includes authorization solver 216 so as to provide microkernel 214 with user authentication needed for the improved HATEOAS architecture. Specifically, after microkernel 214 receives a resource operation (e.g., resource operation request 226, linking operation requests, etc.), the microkernel may be configured to communicate with the authorization solver to ensure that the given resource operation is allowed. In other embodiments, the microkernel may forward a subset of the resource operation request data.

For example, in some embodiments, request 210 may further comprise a user identifier (e.g., user identifier 135) indicating the user providing the request. The user identifier may comprise any data, or combination of data, used to determine the permissions of a given user. For example, in some embodiments, the user identifier may be a substantially unique identity (e.g., user name). In other embodiments, the user identifier may define a role (e.g., administrator) with which permissions are associated, and the role may be shared amongst any one or more users. Generally speaking, request 210 may comprise at least some identifying information such that server system 202 may examine this information to determine whether or not the resource operation identified by the request is allowed to be performed.

Accordingly, upon receiving request 210, microkernel 214 (e.g., handler 215 of microkernel 214) may be configured to determine the user identifier, role identifier, and/or other identifying information, and may thus supply authorization solver 216 with this information. Authorization solver 216 may then be configured to examine the information, and to provide an indication (e.g., yes/no, detailed result, etc.) to microkernel 214 as to whether or not the request may be handled. In other embodiments, microkernel 214 may forward request 210 to authorization solver without first identifying a user, role, etc. It will be appreciated that these scenarios are presented for the purpose of example, and are not intended to be limiting in any manner. The interaction between the various elements of FIG. 2 will now be discussed in greater detail with reference to FIG. 3.

Figure 3:
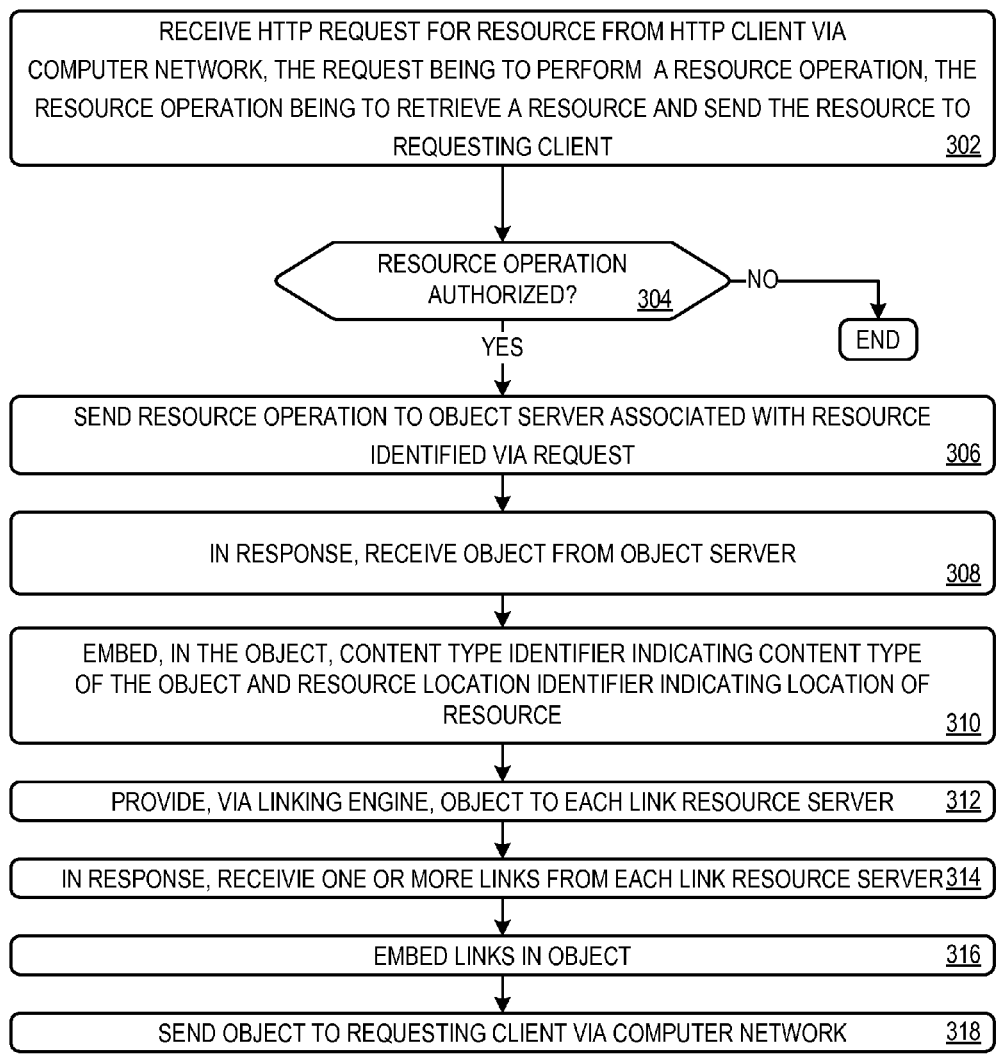
FIG. 3 is a flowchart illustrating a method of serving a resource to a client via a computer network in accordance with one embodiment of the present disclosure.

FIG. 3 illustrates a process flow depicting an embodiment of a method 300 for serving a resource to a client via a computer network at an HTTP server system (e.g., server 102, server 202, etc.) having a stateless microkernel architecture. At 302, method 300 comprises receiving an HTTP request (e.g., request 132) for a resource from an HTTP client via a computer network, where the request is to perform a resource operation. The resource operation may comprise, for example, a request to retrieve the resource (e.g., a READ operation) and send the resource to the requesting client. In order to effect the resource operation, the request may include, for example, a user identifier, a resource URI, and an action to perform on the resource identified by the URI. Although method 300 is described herein with reference to a READ operation, in other scenarios, in accordance with the HATEOAS architecture, the action may be one of: POST, GET, PUT, or DELETE (sometimes referred to as CREATE, READ, UPDATE, and DELETE, respectively). As previously described, the user identifier may comprise any data, or combination of data, used to determine the permissions of a given user.

At 304, method 300 further comprises determining if the resource operation is authorized based on the request. In some embodiments, such a determination may comprise determining a user identifier based on the request and querying an authorization solver (e.g., authorization solver 216) to determine whether a user corresponding to the user identifier is authorized to perform the resource operation. For example, a microkernel of the HTTP server system (e.g., microkernel 214) may be configured to determine the user identifier from the request (e.g., by parsing the request), and to query the authorization solver by providing the user identifier. In other embodiments, the entire request and/or a different subset of the request may be provided to the authorization solver. If the resource operation is not authorized, method 300 ends, and thus the resource operation is not performed. In some embodiments, a message indicating the operation failure may be sent to the requesting client.

However, if the resource operation is authorized, method 300 further comprises, at 306, sending the resource operation to an object server associated with the resource identified by the request. For example, as mentioned above, the microkernel of the server system may be configured to determine the user identifier by parsing the user request, and such parsing may further comprise parsing a link included in the request to identify the requested resource. In other embodiments, parsing of the link may be performed upon determining that the resource operation is allowed. Nonetheless, determining which particular resource is requested may be accomplished by recognizing a URI of the resource within the request.

These scenarios are presented for the purpose of example, and are not intended to be limiting in any manner.

In response to sending the resource operation to the object server, method 300 further comprises, at 308, receiving an object from the object server, where the object represents the resource upon performance of the resource operation. In other words, the object may represent the "result" of the resource operation. For example, as the request includes a GET (READ) action (e.g., retrieve the resource), the object may represent the state of the resource upon performance of the GET action. In other embodiments where the request includes a POST (UPDATE) action (e.g., update the resource with new information), the object may represent the state of the resource after the resource has been updated with the new information.

At 310, method 300 further comprises embedding, in the object, a content type identifier (e.g., TYPE 116) indicating a content type of the object and a resource location identifier (e.g., HREF 118) indicating a location of the resource. As mentioned previously, typical HATEOAS systems embed such identifying information within the HTTP header itself. However, as this increases dependency upon the HTTP protocol itself, such a configuration may not provide suitable extensibility and/or may be otherwise undesirable. Accordingly, by embedding the information within the object, the identifying information remains with the object while freeing the HTTP header to provide the "standard" functionality.

As described above, handling of a READ operation may include not just returning a particular object (if at all), but may also comprise determining related information. For example, if the request received at 302 includes a request for an online shopping cart, merely returning the shopping cart object (e.g., cart comprising a list of items) without related information (e.g., price, inventory, etc.) may be undesirable. In such scenarios, the client may be configured to provide one or more calls for the additional information, thereby increasing the complexity of the client and/or decreasing throughput. As such, it may be desirable to both determine the related information and attach the information to the object before returning the object to the requesting client.

Accordingly, at 312, method 300 further comprises providing, via a linking engine (e.g., resource linker 218), the object to each link resource server of the one or more link resource servers. As discussed above, the resource linker is configured to query each of the resource servers to determine if said resources servers are aware of any information related to the resource operation. Said querying may be accomplished, for example, by utilizing the method of FIG. 3. In other words, the linker may query the resource servers by constructing a resource operation for each resource server. In some embodiments, authorization may be performed instead of, or in addition to, the authorization performed at 304. For example, authorization may be performed upon receiving the object and/or before providing each linking resource operation.

As said resource operations result from a "primary" resource operation, said resource operations may be referred to as "secondary" resource operations. By allowing non-kernel elements of the microkernel to query other elements, each element does not need to be "aware" of the state of any other resource since the state can be queried as needed. Such a configuration ensures that only the appropriate resource server acts upon a given resource operation, and that any other resource server must interact with the resource server instead of directly accessing the resource.

In order to provide the related information, each link resource server may be configured to examine the (embedded) content type of the object. Generally speaking, each link resource server includes "linking rules" (e.g., business rules, other logic, etc.) for one or more object types. Accordingly, upon recognizing the content type of the object as a content type for which linking rule(s) exist, each resource server is configured to return one or more links according to the linking rules corresponding to the content type of the object. As mentioned above, if a particular link resource server does not recognize the object type, or otherwise cannot provide a response to the query, the link resource server may be configured to provide a "default action." It will be understood that each resource server receives the object, and does not receive any links provided by the other resource servers. In other words, there may exist no pre-defined order by which the resource servers are queried, and instead the resource servers may be queried in any particular order, so long as each of the link resource servers is queried. In some embodiments, two or more of the resource servers may be queried in parallel.

Thus, in response to the provision at 312, method 300 further comprises, at 314, receiving one or more links from each of the one or more link resource servers. In some instances, there may be no suitable links. At 316, method 300 further comprises embedding the links in the object (e.g., within a "links" data structure/field/etc.). Upon embedding the links, method 300 comprises sending the object to the requesting client via the computer network at 318.

Figure 4:
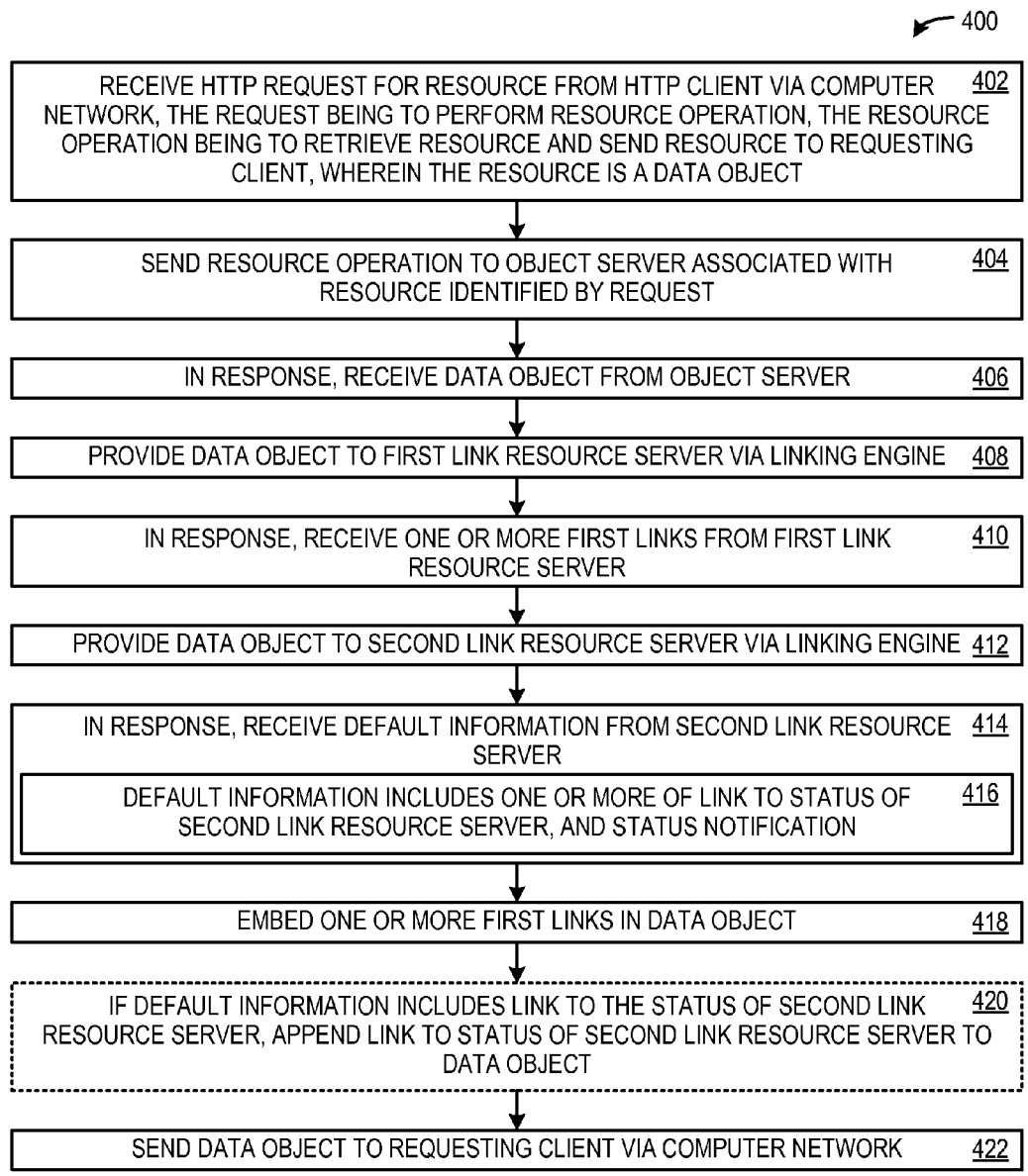
FIG. 4 is a flowchart illustrating a method of operating a stateless microkernel architecture server in accordance with one embodiment of the present disclosure.

Turning now to FIG. 4, a process flow depicting an embodiment of a method 400 for operating a stateless microkernel architecture server including a first link resource server and a second link resource server is illustrated. At 402, method 400 comprises receiving an HTTP request for a resource from an HTTP client via a computer network, the request being to perform a resource operation, the resource operation being to retrieve the resource and send the resource to the requesting client, wherein the resource is a data object.

At 404, method 400 comprises sending the resource operation to an object server associated with the resource identified by the request. At 406, method 400 further comprises, in response, receiving the data object from the object server, and, at 408, embedding, in the data object, a content type identifier indicating the a content type of the data object and a resource location identifier indicating a location of the resource. In other words, the requested data object has been received and the identifier(s) have been embedded in the object. However, it will be appreciated from the preceding discussion that one or more link resource servers may maintain information that is related to the data object.

Accordingly, at 408, method 400 further comprises providing the data object to the first link resource server via a linking engine. In response, at 410, method 400 further comprises receiving one or more first links from the first link resource server. Similarly, at 412, method 400 comprises providing the data object to the second link resource server via the linking engine, Method 400 further comprises, at 414, in response, receiving default information from the second link resource server. The default information may be received, for example, if the second link resource server does not maintain information related to the object and/or if the second link resource server is unavailable. As previously mentioned and as illustrated at 416, the default information may include one or more of a link to a status of the second link resource server, and a status notification.

Method 400 further comprises, at 418, embedding the one or more first links in the data object. In some embodiments, method 400 may further comprise, at 420, if the default information includes the link to the status of the second link resource server, appending the link to the status of the second link resource server to the data object before sending the object to the requesting client. In other words, if the default information includes a link, the link is embedded in the object. At 422, method 400 further comprises sending the object to the requesting client via the computer network.

As described above, one potential advantage of utilizing the REST HATOEAS software architecture is the ability to represent, and to effect a change in, application state over a computer network via linked hypermedia. For example, by sending a POST request including data to be posted to a server, a corresponding resource on the server may be updated to reflect the posted data. After the resource has been updated, typical REST HATEOAS server systems may be configured to return a link to the client that indicates the location of the updated resource. The client may subsequently utilize the returned link to retrieve the updated object by sending a GET request for the resource based on the link. In other words, in order to both effect a system state transition and retrieve object(s) modified thereby, a client in a typical REST HATEOAS system may be expected to provide two different requests to the server. Such a configuration may thus be undesirable, for example, due to decreased throughput caused by the increased network traffic.

Figure 5:
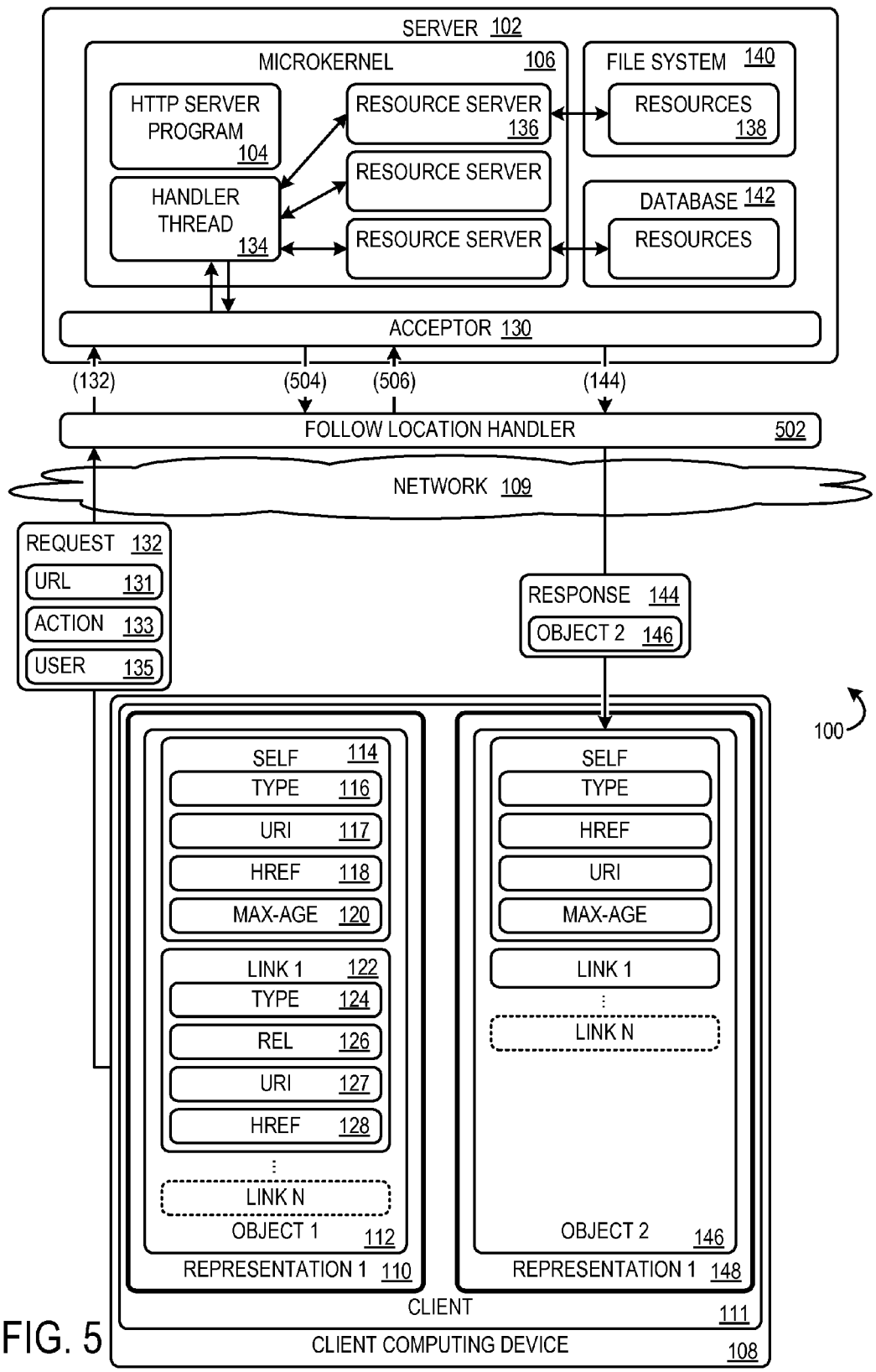
FIG. 5 shows the system of FIG. 1 comprising a follow location handler in accordance with an embodiment of the present disclosure.

It will therefore be appreciated that it may be desirable to provide streamlined mechanism(s) for providing state transitions in a client-server system. Turning now to FIG. 5, the example HATEOAS-based client-server system 100 of FIG. 1 is illustrated. However, FIG. 5 further comprises follow location handler 502 logically positioned between server 102 and client 111. In other words, the follow location handler is logically positioned on a WAN side of server 102. Although follow location handler is illustrated as being external to server 102, generally speaking, follow location handler 502 may be executed on a same computing device as HTTP server program 104, or on a computing device connected via a LAN (not illustrated) to the computing device on which the HTTP server is executed. In some embodiments, server 102 may be unaware that follow location handler is interacting with the network traffic.

As previously described with reference to FIG. 1, client 111 is configured to follow a particular link of links 122 embedded in object 112 by sending request 132 to server 102 via network 109. In the previous discussion, if the request is operable to retrieve a particular resource of resources 138, response 144 received from the server system comprises the requested object. In contrast, if the request is operable to effect a state transition, such as by posting information to the resource, the response in a typical REST HATEOAS system may comprise a link to the corresponding updated data object. The client may thus be expected to provide a separate READ request to retrieve the object, if desired.

Generally speaking, follow location handler 502 is configured to act as a server-side middleman between server 102 and client 111 by intercepting and selectively forwarding information, such as requests 132 and responses 144, between the sever and the client. In other words, upon recognizing particular requests 132 or responses 144, follow location handler 502 may be configured to forward the requests and the responses to the intended destination. Furthermore, upon recognizing other responses 504 from server 102, follow location handler 502 may be configured to programmatically generate one or more requests 506 to server 102 without providing responses 504 to the client. Example operation of a server system comprising an embodiment of a follow location handler 502 will now be discussed with reference to FIG. 6.

Figure 6:
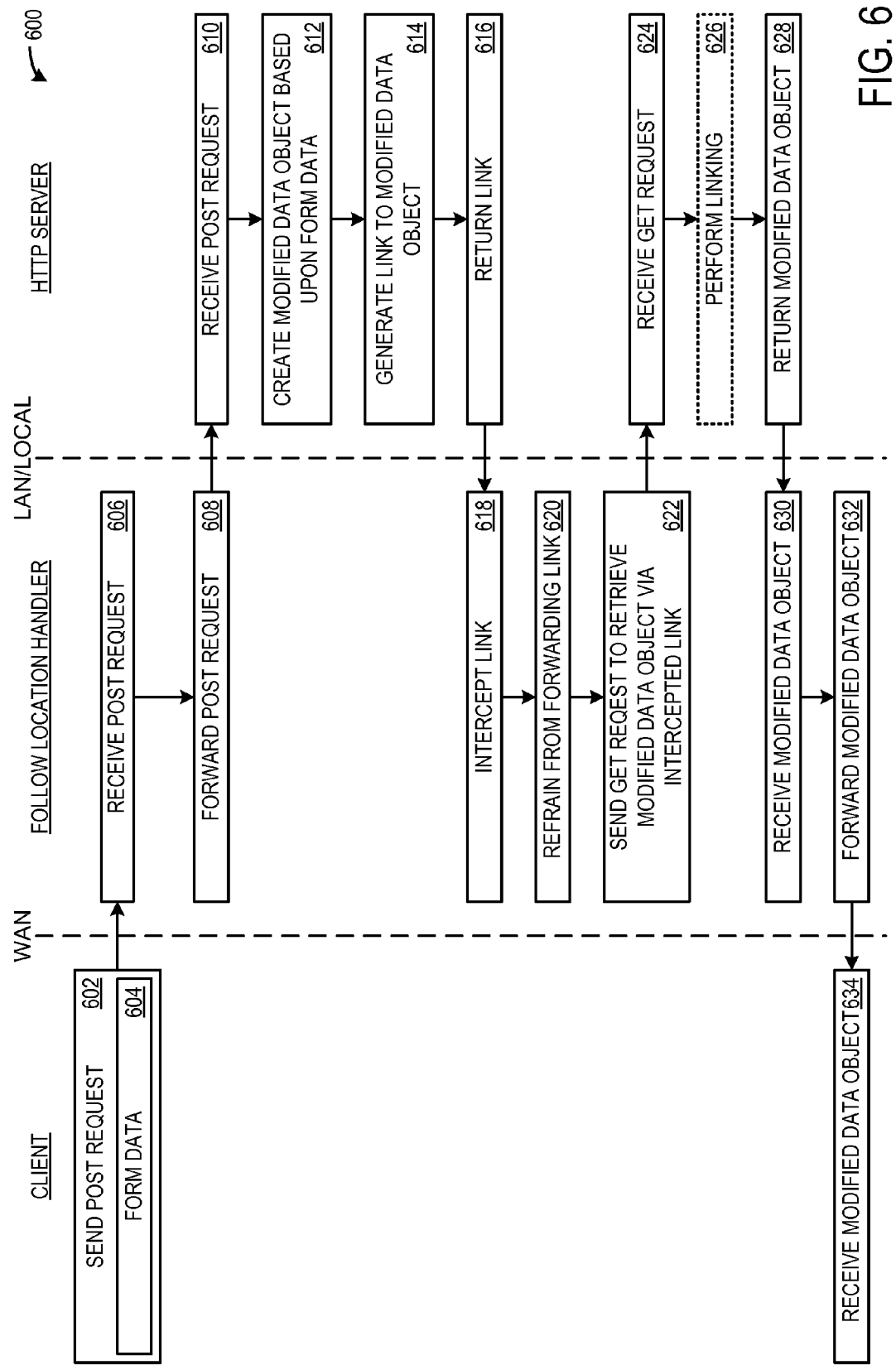
FIG. 6 shows a flowchart illustrating a method of serving a resource from an HTTP server to a client via a computer network in accordance with another embodiment of the present disclosure.

FIG. 6 illustrates a flowchart depicting an embodiment of a method 600 of serving a resource from an HTTP server (e.g., server 102) to a client (e.g., client 111) via a computer network. At 602, the client sends a POST request (e.g., request 132) including form data 604 via the WAN. In other words, the request includes information to be applied to a resource, and the action to be performed on the resource so as to provide such application. A follow location handler (e.g., follow location handler 502), receives the POST request at 606, and, at 608, forwards the POST request to the server system. In other words, the follow location handler may be configured to recognize the received request as a POST request and to subsequently forward the request to the server so that the server can attempt to fill the request.

The server receives the post request at 610, and, at 612, creates a modified data object based upon the form data. In other words, upon posting the form data to the resource, the state of the resource is updated, and the server is configured to update the data object accordingly. Since the request is a POST request, as opposed to a GET request or other operation where one or more objects are to be returned, the server system generates a link to the modified data object at 614, and, at 616, returns the link to the modified object.

In some embodiments, for example, where the follow location handler and the server are substantially cooperating, the server may be configured to send the link to the modified object directly to the follow location handler. In other embodiments, for example, where the follow location handler is substantially transparent to the server, the follow location handler intercepts the link to the modified data object from the server at 618. Regardless of how the link arrives at the follow location handler, the follow location handler refrains from forwarding the link to the requesting client over the WAN at 620. As mentioned above, if the link to the modified data object were to be forwarded to the client, the client would be expected to generate a second request to retrieve the updated object, if desired. In contrast, the follow location handler may be configured to send a GET request to the server to retrieve the modified data object via the intercepted link at 622. In other words, the handler may receive the link, prevent the link from being provided to the client, and programmatically provide a request for the updated data object identified by the link. It will be appreciated that such operation may be substantially transparent to the server and/or the client.

At 624, the server receives the GET request. As previously described with reference to FIG. 2, before returning a requested object, a REST HATEOAS system in accordance with embodiments of the present disclosure may be configured to perform linking in order to embed information related to the object within the object itself. Thus, in some embodiments, the server may be configured to perform linking at 626. Regardless of whether or not such linking is performed, the server system returns the modified data object at 628.

At 630, the follow location handler receives the modified data object, and, in response, forwards the modified data object to the client at 632. The client thus receives the modified data object at 634. Upon receiving the modified data object, the client may be configured, for example, to update the entire representation of the object and/or to update a portion of the representation. In other embodiments, the client may not update the representation. From the discussion of FIG. 6, it will be appreciated that a follow location handler in accordance with embodiments of the present disclosure may be configured to effect a second request, and handle the response thereto, upon recognizing a request from a client. In other words, such a configuration may enable the performance of compound resource operations in a manner that is substantially transparent to the client and/or the server.

In some embodiments, client-server interaction may be related to user-interaction with a form. Forms comprise one or more control objects enabling a user to provide information to the server for further processing. Forms are utilized by many pages on the World Wide Web to provide functionality such as providing user feedback, inputting address and/or payment information, performing search queries, and the like.

Figure 8:
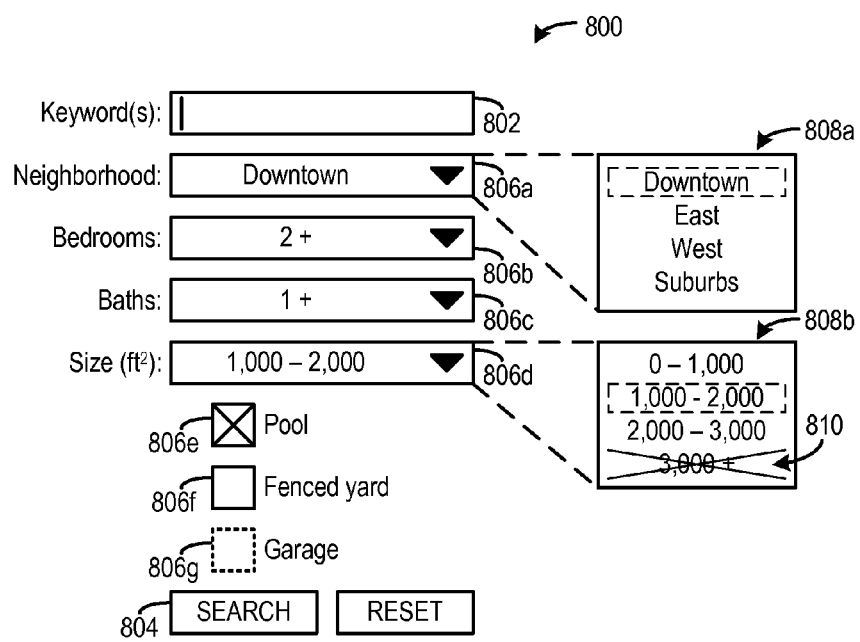
FIG. 8 shows an example of a form comprising a plurality of selector control objects in accordance with embodiments of the present disclosure.

For example, FIG. 8 illustrates an example of an embodiment of a form 800 for performing a real estate search, for example, by querying a real estate database. Form 800 includes text input mechanism 802 to receive text-based form data in the way of one or more keywords. If a user wishes to search via keyword(s), text is entered via mechanism 802 and the form data is submitted upon actuation of POST mechanism 804, illustrated in the form of a "search" button. Returning briefly to FIG. 5, follow location handler 502 may be configured to recognized such a request, and may be further configured to handle response 504 and request 506 such that response 144 returned to client 111 includes an object comprising the search results. In other instances where such follow location functionality is not provided, a link to a search results object may be returned, and the client providing form 800 may be expected to provide a second request to retrieve the search results.

Returning to FIG. 8, manual information entry of form data may be undesirable in some instances, such as, for example, when particular information is constrained to a finite set of allowable information. Therefore, form 800 further comprises selectors 806, such as neighborhood selector 806a, bedroom selector 806b, baths elector 806c, and size selector 806d. Each selector 806 is configured to provide a plurality of selection options 808 for selection by the user. In the illustrated example, neighborhood selector 806a receives input of a desired neighborhood by allowing a user to select a particular selection option from the selection options 808a of "Downtown," "East," "West," and "Suburbs." In other words, a user interacting with form 800 is therefore able to define a state of neighborhood selector 806a by selecting one or more of the selection options of selection options 808a, and the state of selector 806a may not be set to a state that does not correspond to one or more of selection options of selection options 808a. Further, selector 806a may be populated only with selection options 808a that are valid and selectable given the current state of form 800. Relationships between selectors 806 will be discussed in greater detail below.

In some embodiments, form 800 may further comprise selectors 806e, 806f, and 806g. These selectors are illustrated in the form of checkboxes, and are configured to provide two potential states. In other words, selectors 806e, 806f, and 806g enable selection of one of two pre-defined potential states, e.g., TRUE or FALSE, YES or NO, ON or OFF, etc. Although the configuration of selectors 806 is provided for the purpose of example, it will be appreciated that these configurations are not intended to be limiting in any manner.

Before continuing with the discussion of FIG. 8, implementation of selectors via the described improved HATEOAS REST architecture will be described with reference to FIG. 7. As mentioned above, state modifications are typically performed by issuing a POST command to provide form data to a resource, issuing a PUT command to update a resource, and/or issuing a DELETE command for a resource. In some embodiments, a particular current state may correspond to a finite set of potential state transitions. For example, an e-commerce system may be configured to only serve customers living within North America. Accordingly, during checkout, a user of such a system may be able to select a country for a delivery address from a selection of countries in North America. In this way, the business rules limiting sales to North America may be implemented by constraining the selection of shipping destination countries to countries within North America.

Figure 7:
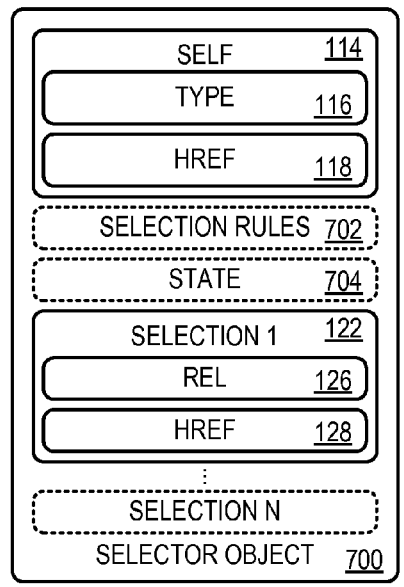
FIG. 7 schematically shows a selector object in accordance with an embodiment of the present disclosure.

FIG. 7 schematically illustrates object 700 in the form of a selector object. From the preceding discussion, it will be appreciated that identification of the object as a selector object is accomplished by defining a selector schema via type 116 of self entity 114. Self entity 114 further includes HREF 118 that points to the location of the resource server that provided selector object 700.

Selector object 700 further comprises a plurality of links 122, referred to herein as "selection options" when embedded in a selector object. As each selection option corresponds to a potential state of the selector object, each link 122 that serves as a selection option includes a description of the selection indicated by REL element 126 and a corresponding action indicated by HREF element 128. For example, in some scenarios, the action may include posting the selection option selected by a user, referred to simply as a "selection," to the resource at location 118. In other words, upon selecting a particular selection link 122, HREF 128 associated with the selection may be followed in order to effect the corresponding state transition.

In some embodiments, selector object 700 may be generated by a selector resource server, and the selector object may be provided to each resource server in order to effect linking of the one or more selection options. Accordingly, if selector object 700 corresponds to an address selection menu, a plurality of selection options 122 may be provided by a user accounts resource server, where each selection option 122 corresponds to a stored address for a user.

As briefly mentioned above, the schema identified by TYPE element 116 may indicate the presence of one or more additional, type-specific fields within the object. Thus, in some embodiments, selector object 700 may further comprise selection rules 702 and/or current state 704. Selection rules 702 may include any one or more rules defining the selection behavior of selector object 700. The selection rules may indicate, for example, how many selectors, if any, may be simultaneously chosen. For example, it may be desirable in an e-commerce scenario to ensure that a user is able to select only one destination country. Current state 704 may be usable to determine the state of the resource on the server that is represented by selector object 700, thereby enabling representation of the current state.

Returning to FIG. 8, relationships between the selectors will now be described. During linking, one or more resource servers may be configured to examine a selector object and, in response, provide one or more selection options for embedding in the object. As each resource may be related to any one or more other resources, it will be appreciated that the provision of one or more of the selection options may depend on the state of one or more other selectors and/or the state of one or more other resources.

Thus, as the user interacts with each selector in the control and makes a selection of a selection option, client side logic in the selector causes a POST command to be programmatically issued upon the client receiving the selection without waiting for the page to be reloaded or the form to be posted by the user via a "submit" selector, etc. Each time a selector state changes in the control, a POST command is issued and the state of the entire control is updated, thus ensuring that only relevant and selectable selection options are presented to the user in the control.

In the illustrated form 800, selection options 808 provided by size selector 806d may depend upon the state of neighborhood selector 806a. For example, if available real estate in the downtown neighborhood is all less than 3,000 square feet, a query for real estate that is both in downtown and over 3,000 square feet may provide zero results, and such a state may not be allowed by an example system. Accordingly, upon selection of the "Downtown" selection option of selection options 808a, the selection may be posted to the server, and an updated selector object corresponding to size selector 806d may be received that does not include the "3,000+" selection. In other embodiments, the updated selector object may include such disabled selection(s) such that the receiving client is able to provide representation 810 of the disabled resource. Although illustrated as a crossed-out selection option of selection options 808b, it will be appreciated that representation 810 is provided for the purpose of example, and that the representation of disabled selectors may have different representations, if any. As another example of relationships between selectors 806, upon selection of the downtown neighborhood, selector 806a providing binary selection options of a garage option may be disabled and set to a FALSE state, indicating that no real estate corresponding to the states of selectors 806 includes a garage. In such instances, selector 806g may be grayed-out or otherwise disabled, as illustrated by the dashed outline, though other representations are possible without departing from the scope of the present disclosure.

Generally speaking, interaction with a computing system is a progression of individual state transitions. As described above, one potential advantage of utilizing the REST HATOEAS software architecture is the ability to represent, and to effect a change in, application state over a computer network via linked hypermedia. For example, a state transition may be effected by sending a POST request including data to a server. Sending of such a command may subsequently effect the above-described linking workflow at the server, and the new state of the system is provided as an updated data object returned to the requesting client. It will be appreciated from the above discussion that each resource server may provide control over the linking workflow by selectively and intelligently providing information.

In other words, each link resource server is able to examine a data object, and may selectively provide, and similarly may selectively withhold, related information known to the link resource server. As one non-limiting example, a particular resource sever may provide an "add to cart" link to an in-stock product object, whereas the same resource may withhold such a link from an out-of-stock product object. In this way, the example link resource server is able to prevent a purchase workflow from proceeding by selectively withholding or the "add to cart" link. In the described example, the example link resource server is able to halt progression of the workflow based on substantially resource server-specific information. That is, the link resource server selectively provides the "add to cart" link based on an understanding of whether or not a particular product is in-stock. In typical use case scenarios, such information may be provided by one or more other link resource servers (e.g., inventory link resource server).

However, as described above, each link resource server may be configured to examine the data object, and may not be aware of link(s) provided by one or more other link resource servers of the system. For example, in a typical e-commerce system utilizing the HATEOAS architecture, a shipping resource server may rely upon information provided by one or more other link resource servers (e.g., a shipping address provided by a customer account resource server) in order to determine shipping costs or estimated delivery time, for example. As the shipping resource would be unaware of the shipping address information provided by the other link resource server, the shipping address would be undefined from the view of the shipping resource server, and the shipping resource server may thus not attach the shipping information to the data object.

As it is typically undesirable to create a purchase without identifying a shipping address, such systems may utilize additional logic to verify that such information is provided before allowing a state transition (e.g., product purchase) to occur. Generally speaking, it may be desirable to ensure that all critical information is attached to the object before allowing the state transition. It will be appreciated that this scenario is simplified for ease of understanding, and that practiced HATEOAS systems may experience a plurality of interdependencies among a plurality of resource servers. For example, with reference to the above described example, a shipping resource server on a typical HATEOAS server may rely upon address information, product weight and/or physical dimension information, product inventory information, and/or other information in order to determine applicable shipping link(s), and this information may be provided in any combination via any number of individual resource servers.

Accordingly, it will be appreciated that it may be desirable to provide mechanism(s) by which each resource server may halt the workflow upon occurrence of one or more critical conditions not being met. For example, a particular type of link, referred to herein as a stop condition link, may be attached to a data object during linking to prevent further state transitions from occurring until the condition has been satisfied, which may occur for example, by a user inputting missing information, making a selection of a required option, or selecting a different option, etc. Although examples provided herein are directed toward a product purchase state transition, it will be appreciated that stop condition links may be usable to control other state transitions without departing from the scope of the present disclosure. By providing such a mechanism, it may be possible for each link resource to halt the workflow without impacting the extensibility of the HATEOAS architecture. In other words, business rules may be updated and/or new link resources server may be added, and the link resource servers may be able to enforce the updated logic (e.g., by applying stop condition(s)) without undue burden.

Figure 9:
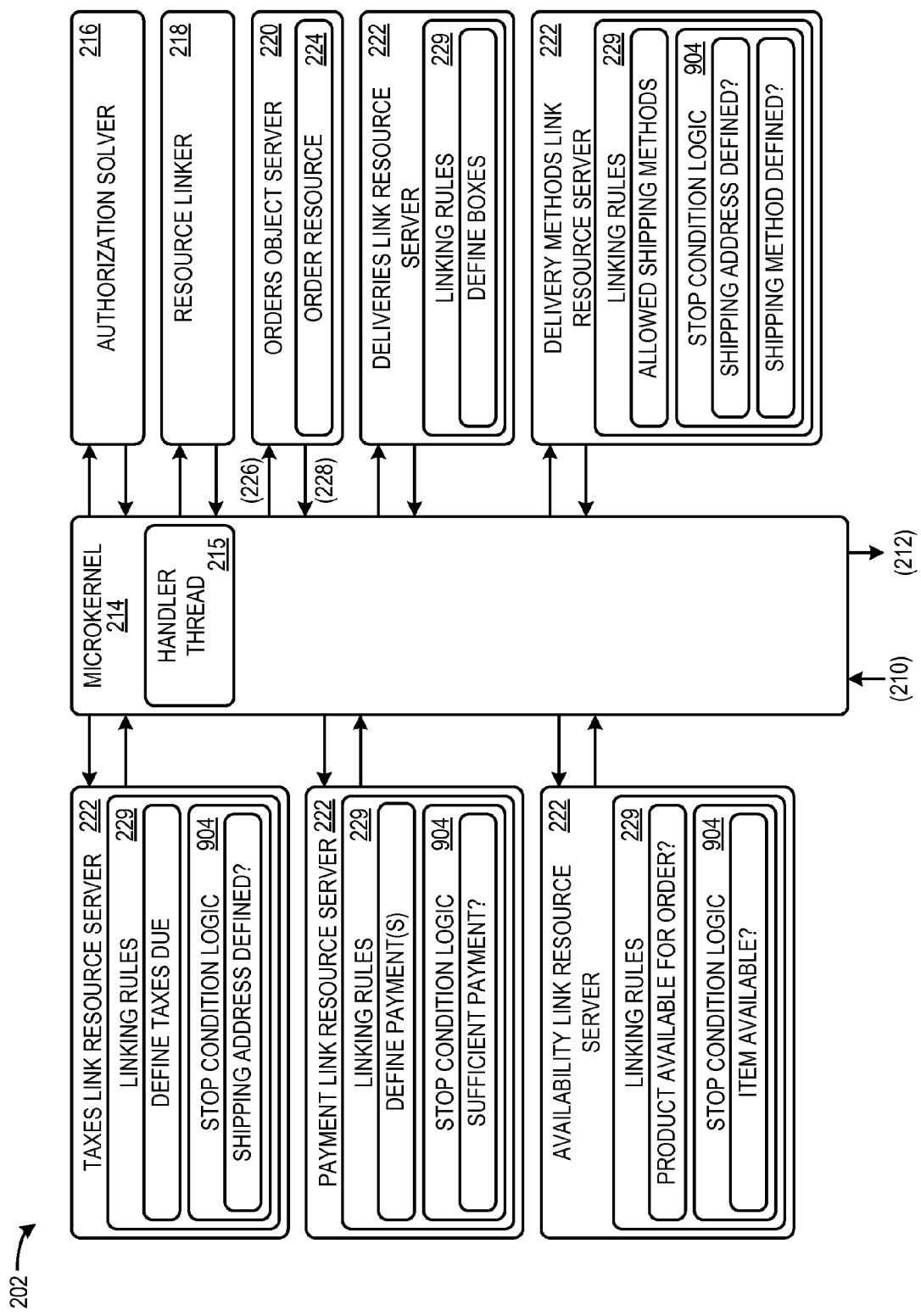
FIG. 9 shows a non-limiting example of a HATEOAS microkernel providing stop condition functionality in accordance with an embodiment of the present disclosure.

Turning now to FIG. 9, server 202 of FIG. 2 is shown including object server 220 and a plurality of link resource servers 222 each implementing linking rules 229 including stop condition logic 904. Specifically, the example server provides electronic commerce functionality, and an example request-response workflow of server 202 for attempting a purchase is as follows.

In order to effect a purchase, request 210 received from a client may include, for example, a request to POST information to the orders object resource server. Operation request 226 based on request 210 is provided to the orders object server 220, and data object 228 based on orders resource 224 is returned. Object 228 may describe, for example, the contents (e.g., one or more products and/or services) of an online shopping cart. Upon receiving the data object, microkernel 214 provides the data object to resource linker 218 to effect one or more linking operations. As described above, linker 218 presents the data object to each of the link resource servers 222, and each link resource server examines the data object (e.g., via analysis of known data field(s)) for predefined information (e.g., TYPE 116). As a result of such examination, each link resource server is configured to provide zero or more links according to resource-specific linking rules 229.

Previous discussions regarding such linking operations were provided with reference to implementation of resource-specific business logic. For example, in the depicted configuration, the taxes link resource server 222 includes linking rules 229 defining how much tax, if any, to charge for a particular purchase. Such determination may rely upon, for example, a shipping address (e.g., state/province and/or country), a product type (e.g., tax-exempt), user account information (e.g., association with tax-exempt entity), and the like. Such information is expected by the taxes link resource server to be included with the data object 228 (e.g., via previous linking operations) or otherwise available to the taxes link resource server (e.g., within a corresponding tax resource). If such information is available, the example taxes link resource server may be configured to supply one or more links indicating an amount of tax to add to apply particular product(s). However, if such information is not available, the taxes link resource server may be configured to not return any links. Links are collected from each of the remaining link resource servers, as described above, and the links are subsequently embedded in the data object before the object is returned to the requesting client.

In this example scenario, the requesting client may be expected to ensure that the returned data object includes all necessary links to provide a particular state transition (e.g., product purchase). In other words, the client may be expected to examine the data object and determine, for example, whether or not the appropriate taxes link(s) were embedded by the resource linker. If such verification were not provided, it may be possible for a purchase state transition to occur without necessary taxes and/or other critical information being included. However, as the interdependencies between the various links may be complex, the implementation of the additional logic at the client may result in a client of unsuitably large size, which may be undesirable in some scenarios (e.g., mobile computing scenarios). Further, a client-side implementation may be undesirable, for example, as such a configuration relies upon the described additional logic being provided by each and every client. Thus, upon update of the business rules (e.g., change in tax rules, introduction of fees or levies, etc.), each client device must be subsequently updated, thereby negatively impacting the extensibility of the HATEOAS-based system.

It will thus be appreciated that it may be desirable to provide mechanism(s) by which the various resource servers may impart control (e.g., halt progression) over a server-side workflow without violating other tenets of the described REST HATEOAS architecture, namely that each resource server is substantially independent of each other resource server. It may further be desirable, once the workflow has been modified, to provide mechanism(s) for elucidating such modification (e.g., alerts, etc.) and/or for correcting the underlying causes of the modification (e.g., information input mechanisms).

Accordingly, linking rules 229 of each link resource server 222 may further implement stop condition logic 904 configured to determine if a predefined condition has been met, such as whether critical information has been included in data object 208. Critical information may be defined as information without which the transaction cannot be completed, such as a required user input, or required condition of the system, etc. One specific example of such critical information might be entry of a confirmable shipping address, and another might be a failure of the user to check the box agreeing to the terms of use for the website. Another example of such critical information might be a system condition such as the existence currently available inventory to satisfy an order, and another might be that the shipping address is within the United States. It will be appreciated that critical information will be defined within the logic of the stop conditions themselves. If information critical to a particular link resource server is not included, that resource server may be configured, based on stop condition logic 904, to provide one or more stop condition links during interaction with resource linker 218. The stop condition links may be provided according to the underlying link schema employed by the system, thereby preserving the extensibility of the system. That is, a "REL" element (e.g., element 126), which is configured to identify a name of the particular relationship, may be assigned a value common to all stop condition links, such as, for example, "needinfo." Accordingly, mechanisms configured to detect such stop condition links, which will be discussed in greater detail below, may be configured to examine the link(s) embedded in the data object and determine if any of the links include such a REL element 126.

Since the stop condition links often represent the absence of information needed for a particular state transition, it may be desirable to provide mechanisms by which the missing information may be acquired. With this in mind, it will be appreciated that the employed link schema may already provide such mechanisms. Namely, an "href" element (e.g., element 128) identifying the "destination" of the link may identify a location of one or more mechanisms (e.g., a user input/selection mechanism) usable to satisfy the issue(s) effecting in the stop condition. In some embodiments, a "selector" object, as discussed above, may be used to resolve such issues, where the selection option(s) of the selector object are selectable by the user to specify the pre-determined information. In other embodiments, additional and/or different mechanisms may be used without departing from the scope of the present disclosure. In some scenarios, the href element may provide notification of the stop condition link (e.g., error message) instead of, or in addition to, providing mechanisms to satisfy the issue(s). Generally speaking, by providing a consistent, system-wide stop condition schema, the extensibility of an implementing system may be maintained across system updates.

Returning to the example workflow, each link resource server 222 is queried by resource linker 218, and each of the link resource servers provides one or more link(s), some of which may be stop condition links, in response. As described above, the resource linker is configured to embed the links in the data object before the data object is returned to the requesting client. In the case of stop condition links, the resource linker may be configured to first determine whether or not any of the stop condition links have matching link targets. As mentioned above, the target (i.e., href) of each stop condition link provides information regarding the cause of the stop condition and/or mechanisms for specifying the missing information. Accordingly, it will be appreciated in some scenarios that more than one stop condition link may include the same target, as a single piece of missing information may effect a plurality of linking rules 229.

For example, as illustrated, both the taxes link resource server and the delivery methods link resource server implement stop condition logic 904 regarding whether or not a shipping address has been defined. In other words, if a shipping address has not been defined, neither the taxes link resource server nor the delivery methods link resource server is able to provide its relevant information (i.e., taxes due and shipping method/price). As such, both the taxes link resource server and the delivery methods resource server may be configured to provide, in response to receiving the data object, a stop condition link directed towards a mechanism (e.g., address selector, address input mechanism, etc.) to define the missing shipping address. In other words, the stop condition links provided by each of the two link resource severs may be satisfied by input of the same information, and thus access of the same link target.

Accordingly, the resource linker may be configured to examine the link(s) received from the various link resource severs 222, and may embed only one instance of each stop condition link. In other words, if two or more stop condition links include the same link target, the resource linker may embed only one instance of the target. In this way, the missing information may be defined once instead of multiple times, thereby potentially providing a more streamlined and less error-prone user experience. Further, the size of the returned data object may be decreased by not including redundant information, thereby potentially increasing performance and/or decreasing a computation burden on each client device.

Upon embedding the appropriate link(s) in the data object, the resource linker may be configured to determine what is to be returned to the requesting client. In previous discussions, the resource linker merely returned the data object 228 to the client. In other words, if no stop condition links are embedded in the data object, the data object may be sent to the requesting client as described above. However, it will be appreciated from the discussion of the REST HATOEAS architecture that the returned data object defines the potential state transitions. Accordingly, as the presence of one or more stop conditions within the data object precludes such state transitions, it will be appreciated that the resource linker may provide additional consideration when stop condition links are present in the data object.

Thus, in some embodiments, resource linker 218 may be configured to examine the data object, and, if stop condition link(s) are present in the embedded object, may return a list of the one or more stop condition links to the requesting client. In this way, by returning only the stop condition links, the client may be provided with an opportunity to define the missing information before the particular state transition is performed (e.g., by receiving the updated data object). Although described as a "list," it will be appreciated that the stop condition links may be provided in any suitable configuration without departing from the scope of the present disclosure.

In other embodiments, the data object and embedded link(s) may be examined via mechanisms other than resource linker 218. For example, in such embodiments, one or more of the resource servers may be defined as a "state transition" resource server. (e.g., online checkout resource server) that is configured to examine the stop condition link(s) provided by the one or more link resource servers. It will be appreciated that these examples are intended to be non-limiting, and various mechanism may be configured to prevent a workflow upon recognition of one or more stop condition links without departing from the scope of the present disclosure.

To this point, stop conditions have been described as "chokepoints" within a workflow that may temporarily halt the workflow until particular information is received or otherwise defined. However, it will be appreciated that, in some scenarios, the particular information may be permanently unavailable. For example, the illustrated availability link resource server is configured to determine whether or not a particular item is available for purchase. Thus, if an item is temporarily out of stock, the resource server may be configured to, for example, restrict purchase state transitions until the item is available or may allow backordering of the item. However, if the item is permanently unavailable (e.g., production ceases, one-off item, etc.), the missing information (i.e., available inventory) will never become available. Thus, in some embodiments, each resource server 222, based on stop condition logic 904, may provide a "critical stop condition link" in such scenarios. Such a critical stop condition link may include a "REL" element (e.g., element 126) having an assigned value common to all critical stop condition links, such as, for example, "stopinfo." A critical stop condition link identifies that the condition for the particular pre-determined information cannot be acquired or satisfied, thereby indicating that the present workflow cannot continue.

Figure 10:
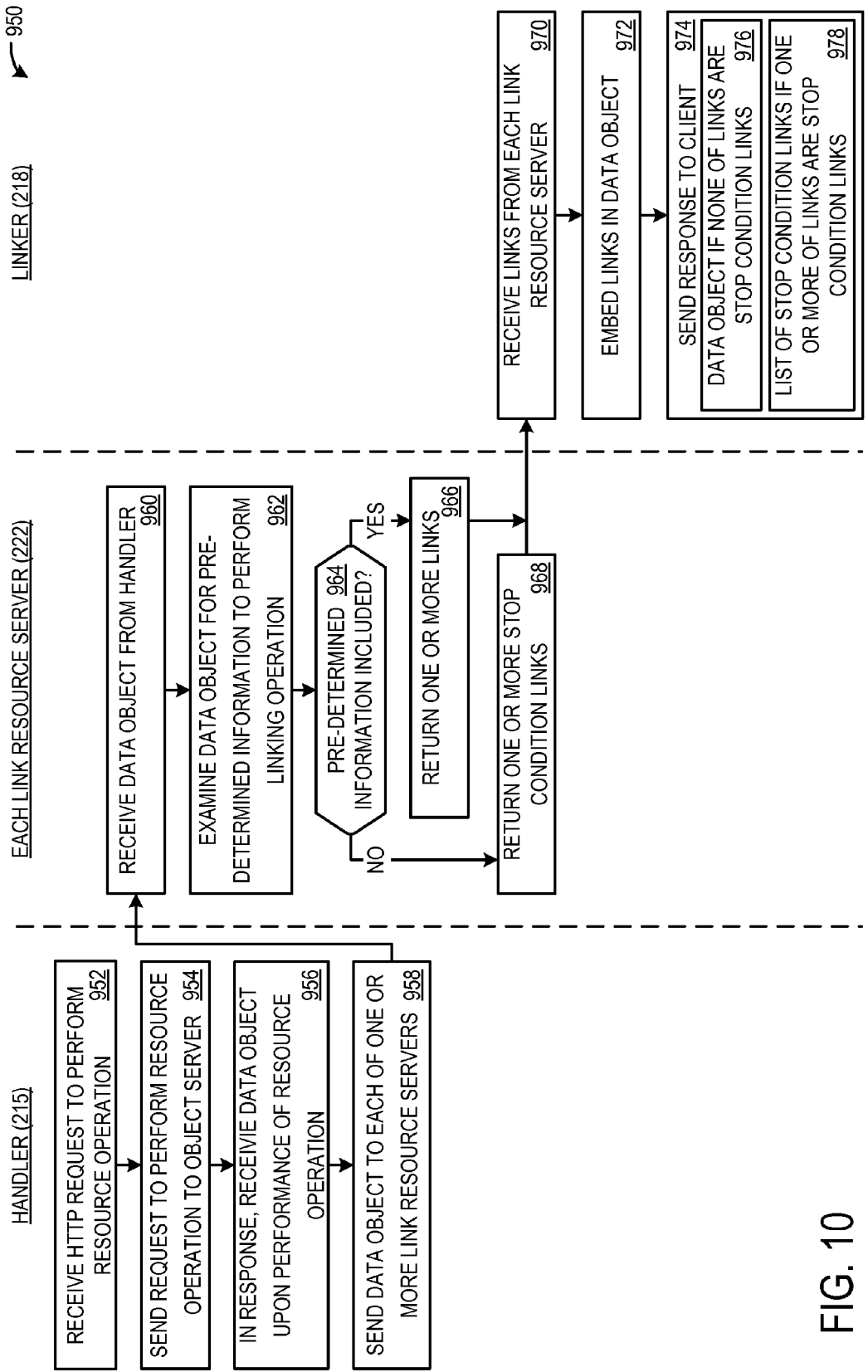
FIG. 10 shows a flowchart illustrating a method of serving a resource to a client via a computer network in accordance with another embodiment of the present disclosure, which features stop condition functionality.

Turning now to FIG. 10, a process flow depicting a method 950 of serving a resource to a client via a computer network is shown. At 952, method 950 comprises, at handler 215, receiving an HTTP request from an HTTP client via a computer network to perform a resource operation on a resource, wherein the resource is a data object. At 954, method 950 further comprises sending a request to perform the resource operation to an object server associated with the resource, and, in response, receiving 956 the data object from the object server upon performance of the resource operation by the object server. For example, the resource operation may include posting form data to the resource, and the data object received from the object server may be a modified data object created based upon the form data. In an electronic commerce scenario, the form data may comprise an online shopping cart posted to an orders resource, and the modified data object may include an order object created based on the online shopping cart. It will be appreciated that these scenarios are presented for the purpose of example, and are not intended to be limiting in any manner. At 958, the method comprises sending the data object to each of the one or more link resource servers in order to effect linking operations, as described above. As described above, the link resource servers may be queried in an order-agnostic and/or substantially parallel manner in some embodiments, though other configurations are possible without departing from the scope of the present disclosure.

Thus, method 950 further comprises, at each link resource server 222, receiving 960 the data object from the handler. At 962, the method further comprises examining the data object for pre-determined information to perform a linking operation. As described above, each link resource server is configured to examine 964 the data object for particular pre-determined information (e.g., information "critical" to a particular state transition), and provide related information known to the link resource sever. Thus, if the data object includes the pre-determined information, method 950 further comprises performing the linking operation by returning 966 one or more links to the handler linking to related information provided by the link resource server. However, if the data object does not include the pre-determined information, method 950 comprises not performing the linking operation and instead returning 968 one or more stop condition links indicating that the pre-determined information is not included. In summary, each link resource server may be configured to examine the data object for particular pre-determined information, and may affect the workflow, either by halting the workflow or providing information relevant to the workflow, based on such examination. From this discussion, it will be appreciated that each link resource server may be configured to operate substantially independently of each other link resource server, while still cooperating with the other resource servers to implement interdependent, complex business rules via the described linking operations.

Method 950 further comprises, at a linking engine executed by the server (e.g., linker 218), receiving 970 the links from each link resource server and embedding 972 the links in the data object. Method 950 further comprises, at 974, sending a response to the HTTP client via the computer network. As mentioned above, the behavior of the resource linker may depend on whether or not any stop condition links are embedded in the data object, and thus whether or not a particular state transition is allowed. For example, if no stop condition links are present in the data object, the response may comprise the data object itself, as shown at 976. However, if the data object does include one or more stop condition links, the response may instead comprise a list of stop condition links, as shown at 978. As mentioned above, such a list may be rendered at the client device so as to enable definition of the missing pre-determined information. In other words, each stop condition link embedded in the data object may be usable by the HTTP client to acquire a mechanism to enable specification or acquisition of the pre-determined information, such as, for example, a selector object comprising one or more selection options. In other embodiments, the list of stop conditions may instead alert a user to the stop condition links (e.g., via one or more error messages), but may not include mechanism(s) by which the missing information may be defined. It will be appreciated that these scenarios are presented for the purpose of example, and are not intended to be limiting in any manner.

Figure 11:
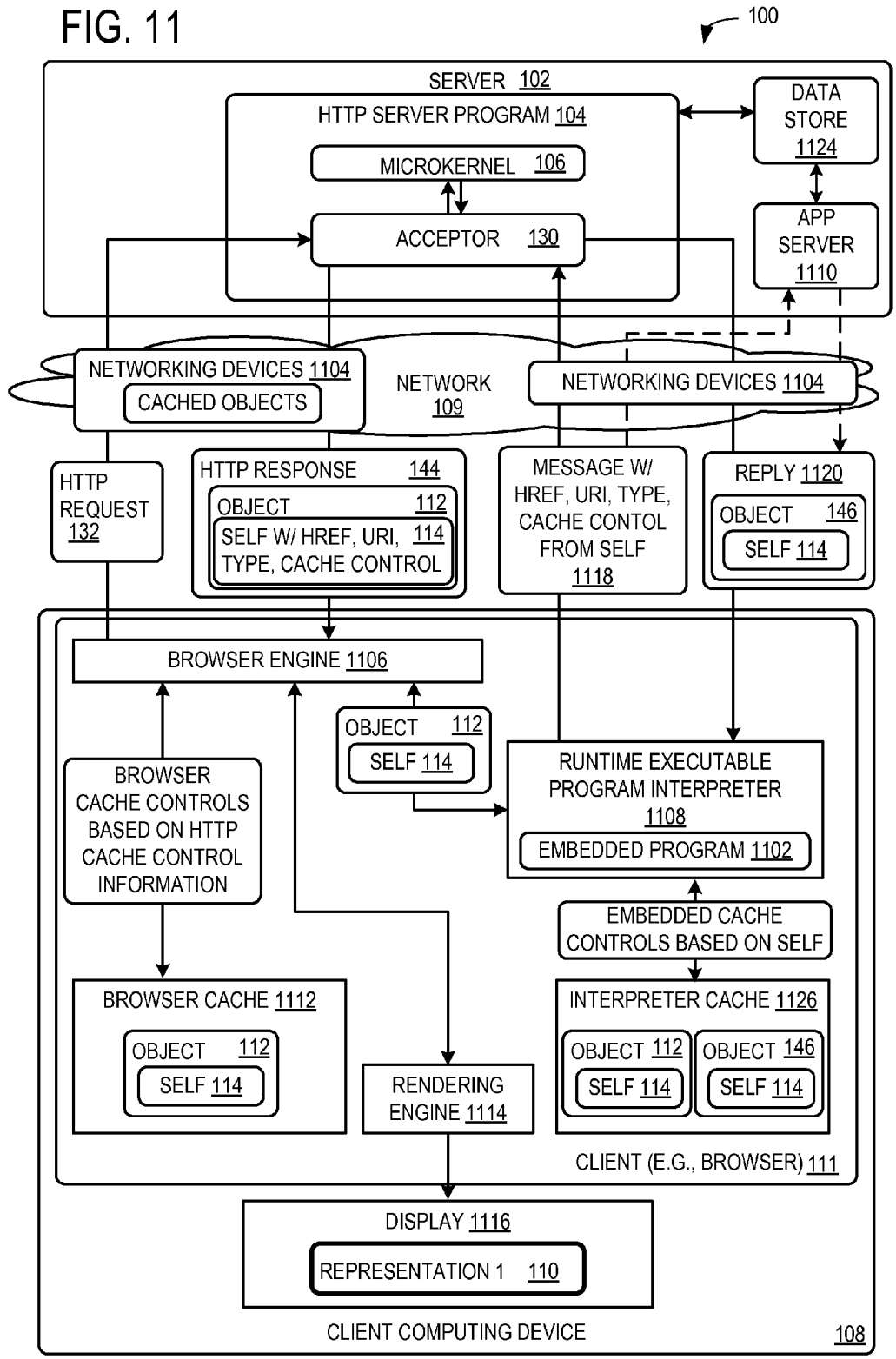
FIG. 11 shows a computing system in which a resource data object is served from a client to a server, the resource data object including a self entity for object self discovery by an embedded program on the client.

FIG. 11 illustrates the system 100 of FIG. 1, configured to serve a data object 112 including a self entity 114, which is used for self discovery of information regarding the data object 112 at an embedded program 1102 of client 111 on client computing device 108. As background, it will be appreciated that the HTTP protocol is an application-level protocol that defines several mechanisms a server may use to inform a client or intermediate networking device 1104 of the content type and desired cache behavior for a data object being transferred, by embedding this information in HTTP headers accompanying the data object being transferred. This enables intermediate networking devices 1104 to properly cache the data object, and also enables an HTTP client, such as a browser engine 1106, to properly process the data object upon receipt. However, on the client side, this information which is stored in HTTP headers, as well as the referring URI and HREF, are data that are typically available only to the HTTP client itself. Other programs that are called by the HTTP client to interpret the data object, such as runtime executable program interpreters 1108, do not have suitable access to the HTTP header information to utilize it. This has been a barrier to the development of REST compliant systems utilizing embedded programs.

To address this issue and make available such information to embedded programs, the system 100 is configured such that, in response to receiving an HTTP request 132 for a data object 112 from a client 111 executed on client computing device 108, the server 102 is configured to generate data object 112 with a self entity 114 embedded therein, and to send the data object 112 with the self entity to the requesting client 111 in HTTP response 144.

Example information that may be included in the self entity 114 is described above, and includes a URI of the data object 112 in a URI space served by the server system 100. As used herein the term "URI space" refers to the network addressable locations served by server system 100 to which the URIs contained in the self entity 114 can be resolved. This URI may be served by HTTP server program 104 of server 102, or by an application server 1110 of server 102, for example. The self entity may also include information on the content type of the data object such as 'application/vnd.elasticpath.cart', 'application/vnd.elasticpath.address' or 'application/vnd.elasticpath.profile'. The self entity may further include cache control information that may be used to control the caching of the data object, such as max-age as described above, which directs a device not to accept a resource with an age greater than the max-age, effectively causing the device not to use resources that have been cached for so long that their max-age has been reached. Other alternative cache control information that may be included are directives for making cache requests such as no-store (which directs devices not to cache the resource), max-stale (which directs devices to request new versions of expired resources only after the max-stale interval has expired), min-fresh (which directs the device not to accept resources with less than a minimum duration prior to expiry), and a directive such as if-modified-since, which causes the client to receive a not modified indication from the server when the client cached version is still current or current version of the requested object. ETags may also be included in the self entity, as discussed in detail below. The self object may also include an HREF associated with the data object. By embedding this data in the self entity, it will be appreciated that the data is easily accessible by downstream programs such as embedded program 1102 even after the HTTP headers are stripped away.

As the HTTP response 144 travels the computer network 109 from the server 102 to the client computing device 108, the various intermediate networking devices 1104 make routing and caching decisions based upon the HTTP header information, according to the HTTP protocol. According to these decisions, the data object 112 may in some cases be cached at intermediate networking devices 1104.

Once the HTTP response 144 is received by browser engine 1106, the browser engine 1106 reads the Content-Type and other HTTP header information from the HTTP response, and performs appropriate processing of the response. One type of processing that is performed is that the browser engine caches the response, if appropriate, based upon the HTTP cache control information, in a browser cache 1112. In addition, for Content-Type values that are parsable and renderable by the browser, such as text/html and image/gif, the browser may parse and render the data object, using rendering engine 1114. The output of the rendering engine 1114 is sent to display 1116, and displayed as representation 110, in the illustrated example.

Some Content-Types may require associated programs, such as plugins, for interpretation. Upon detecting data objects of these Content-Types, the browser engine may be configured to pass the data object to the appropriate program. Thus, in the depicted embodiment, if data object 112 is detected to have a Content-Types of application/javascript (indicating JAVASCRIPT®) or other runtime executable, the data object 112 is passed to the appropriate runtime executable program interpreter 1108, where it is just-in-time compiled and executed as embedded program 1102, also referred to herein as a runtime executable program. Once the data object 112 is received by the embedded program 1102, the data object may be cached by the embedded program 1102 in an interpreter cache 1126, based the cache control parameters that are contained in the self entity 114 of the data object 112.

The embedded program 1102 may be configured to communicate with server 102, through the run time executable program interpreter 1108 environment, and network 109, including intermediate networking devices 1104. Specifically, the embedded program 1102 may be configured to send a message 1118 to the server 102 including various data. Typically, the message 1118 is sent to the HTTP server program 104, according to the HTTP protocol. Alternatively, the message 1118 may be sent to an application server 1110 executed on the server 102 in a shared format and according to a protocol that is known to the application server 1110 and the embedded program 1102. Typically, application server 1110 and embedded program 1102 communicate in protocols other than HTTP, however, HTTP protocols could also be used. The message 1118 may include among other parameters, the URI, content type, HREF, and cache control information contained in the self entity 114 in the data object 112, or other data that is programmatically generated based upon these contents of the self entity 114. Of course, it will be appreciated that in some scenarios only a subset of these parameters will be passed, such as the content type and URI. By passing the data object 112 including the self entity 114 to the embedded program 1102, even though HTTP cache control information stored in the HTTP headers is not communicated to the embedded program 1102, the embedded program 1102 can still have access to such data, and can properly perform caching in coordination with the server 102. By identifying the URI associated with the object, the server 102 can understand the specific instance of the object, and can respond to cache control directives for the data object. In this way the, data object 112 itself can be used to convey application state to the server 102 even in communications from the embedded program 1102.

The server 102, upon receiving the message with the HREF, URI, content type, and cache control information, or other programmatically generated data based on these parameters, processes the message and generates an appropriate reply 1120. If the message requests to read a data object, for example, the server 102 may retrieve an instance of a second data object 146 from the data store 1124, subject to any cache control directives, and return that instance of the second data object 146 in reply 1120 to the client 111. The second data object 146 may contain a self entity 114, like the first data object 112, and the self entity 114 may contain similar data as described above. The self entity 114 for the second data object may be pre-stored in the data object in data store 1124, or programmatically generated by the server 102, based on application logic.

Typically, reply 1120 is sent from the HTTP server program 104 of server 102 in response to messages 1118 received at the HTTP server program 104. Alternatively, in the case where message 1118 is sent to application server 1110, reply 1120 may be sent from the application server 1110 to the embedded program 1102 via an application-specific protocol known to the embedded program 1102 and application server 1110, and not via HTTP, although HTTP could be used if desired. When using protocols other than HTTP, intermediate networking devices 1104 do not cache either messages 1118 or replies 1120. Sometimes intermediate network devices 1104 cache in a manner that either violates the HTTP protocol, follows an older version of the protocol, or is out of protocol, and thus the caching behavior of these devices sometimes can be difficult to predict in practice. For systems that require a high degree of precision when caching assets, such as an e-commerce platform, this can have undesirable consequences, such as a person viewing order status or real-time inventory information that may change frequently. By embedding cache control information in the data object itself and communicating via a non-HTTP protocol between embedded program 1102 and application server 1110, system 100 can offer the advantage of coordinated cache control between the client and server, without exposing the system to possibly unpredictable caching by intermediate networking devices.

Once the reply 1120 is received at the embedded program 1102 of the client 111 on client computing device 108, the embedded program 1102 is configured to, if appropriate, cache the second data object 146 in an interpreter cache 1126, based upon the cache controls present in the self entity 114 contained within the second data object 146. In this manner, the embedded program 1102 can receive data objects that were originally retrieved by the browser engine 1106 via the HTTP protocol, and can "self discover" information about those data objects that enables communication in a stateful manner with server 102, all while maintaining a local interpreter cache of the objects based on the cache control information in the objects themselves.

Finally, it will be appreciated that the embedded program 1102 may process the data object 146 and send a result of the processing as output, via the browser engine 1106 and rendering engine 1114 for display on display 1116. In this manner, information retrieved from the server 102 by the embedded program 1102 may be displayed on display 1116, for example. Likewise, data object 112 may be processed and the results displayed on display 1116.

System 100 may be configured as an e-commerce platform, with HTTP server program 104 serving web pages, and HTTP server program 104 and/or application server 1110 serving web application data to calls from embedded programs within the web pages of the e-commerce platform. The system 100 enables the state of data objects to be monitored across both the browser engine to server exchange and embedded program to server exchange, thereby enabling the application state of the e-commerce platform to be represented in the data objects themselves, and realizing a goal of the REST HATEOAS architecture, which has heretofore proved elusive.

Now, a few specific example applications of system 100 will be described. In a first example, data object 112 is a .js (JAVASCRIPT®) file and is executed and displays a user interface, such as a shopping cart user interface, to the user, and data object 146 contains data, such a product image, price data, quantity in cart, etc., that is displayed within the user interface generated by the data object 112, for a particular user session interacting with the system 100. As a second example, it will be appreciated that a plurality of display handlers may be defined within the client 111, and the runtime executable program 1102 may use the self entity content type to direct the data object 112 to the correct display handler. For example, a content type of 'application/vnd.elasticpath.cart' is rendered for display by the cart display handler. As a third example, the runtime executable program 1102 within the client 111 uses the self entity 114 cache control information to operate in an offline mode, in which the client computing device is not connected to network 109 and server 102. When a user interacts with the embedded program 1102 offline, the runtime executable program 1102 is no longer able to contact the server 102 to determine whether a cached data object is the most recent version of that data object, and therefore the runtime executable program 1102 is instead configured to make a determination what of whether a cached data object in the interpreter cache 1126 may be used based upon the cache control information in the self entity for the data object 112, and appropriately update information display to the user, even though the device is offline. As a fourth example, the URI in the self entity 114 may be used to assemble a number of data objects into a combined object graph. This object graph may be used to combine the results of many calls from the embedded program 1102 to the server 102 into a large reference object. For conventional systems that do not have granular cache control at the data object level, as system 102 does, this would be impractical, since the likelihood of at least some of the graph containing uncachable data is high and therefore the HTTP level caching directives would make the aggregate data objects uncachable. However, system 100 can use granular cache control at the object level at the client 111 to overcome this disadvantage of conventional systems, and also can send messages 1118 and replies 1120 between the embedded program and application server over protocols other than HTTP, to completely avoid HTTP level caching directives.

Figure 12:
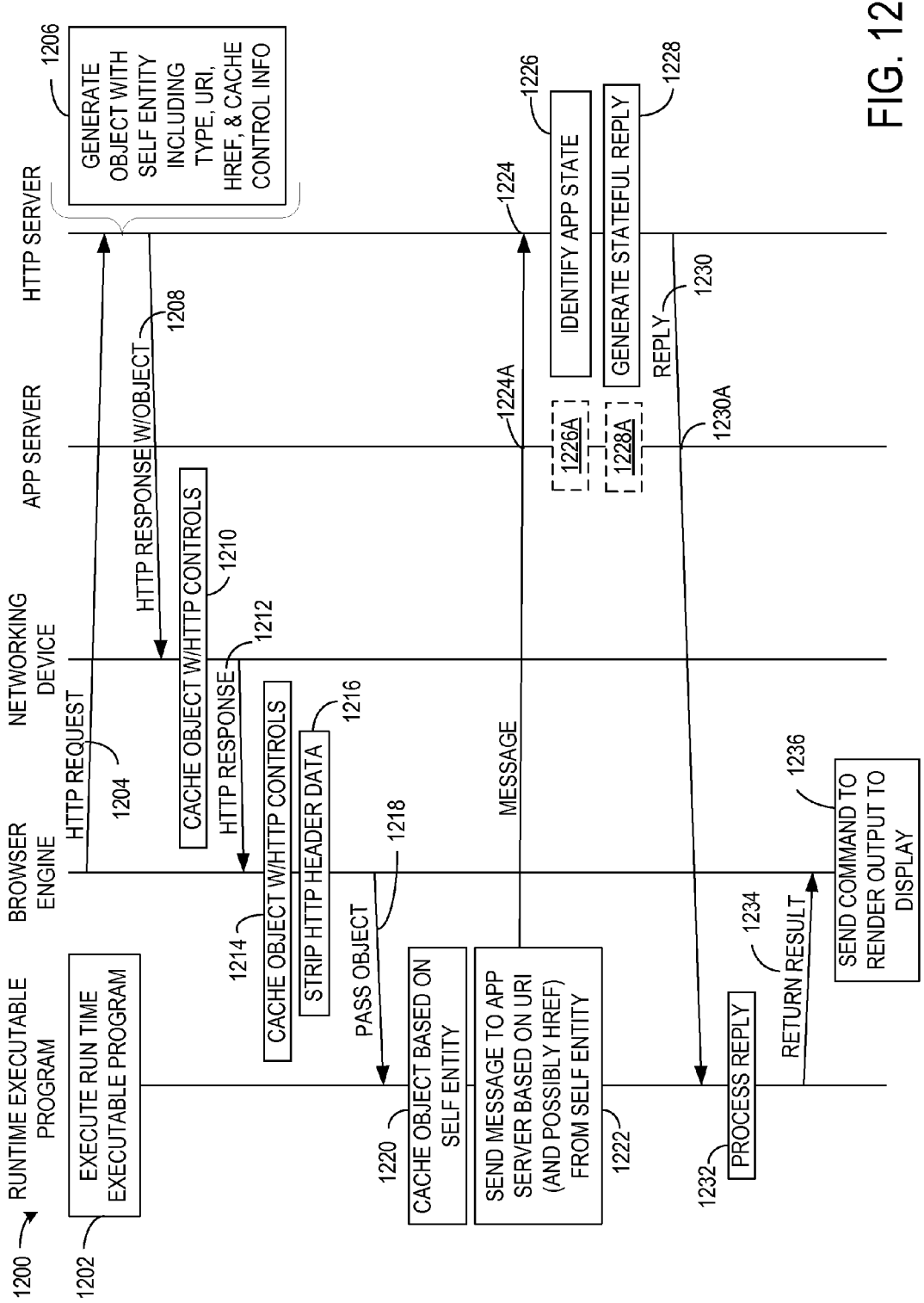
FIG. 12 illustrates a method for exchanging a resource data object between a client and a server, with a self entity that may be used for object self discovery by an embedded program on the client.

Turning now to FIG. 12, a method 1200 is illustrated for exchanging over a computer network a self discoverable data object between a client executed on a client computing device and a server system including a server with a stateless REST-compliant software architecture configured to respond to HTTP requests from a browser engine of the client. The server is configured to reply to messages from a runtime executable program executed by a runtime executable program interpreter of the client on the client computing device. It will be appreciated that method 1200 may be implemented using the hardware components illustrated in FIG. 11, or via other suitable hardware components.

The method 1200 may include, as shown at 1202, executing a run time executable program in a runtime executable program interpreter. At 1204, the method may include, sending an HTTP GET request for a data object from a browser engine executed on a client computing device to the server via a computer network, and accordingly, at the server, receiving the HTTP GET request from the browser engine of the client computing device via the computer network. At 1206, at the server, the method may further include generating the data object with a self entity including a URI and a content type of the data object.

The self entity may further be generated to include cache control information and/or an HREF for the data object, in addition to the URI and content type information discussed above. The cache control information may include one or more of a max-age indicator, an ETag, and a Last-modified indicator, or other cache control parameter discussed above in relation to FIG. 11. It will be appreciated than an ETag, or entity tag, is an HTTP mechanism that can be used to cause a requesting client to transmit a request for a data object to a server, along with an ETag of a cached version of the request. The server can compare the ETag and only respond with a new version of the data object if the ETag received doesn't match the ETag for the most recent version at the server, thus indicating that a different, more recent version of the object is available at the server. Thus, according to method 1200, the runtime executable program requests a new instance of the data object and sends the ETag with the request, and the application server is configured to respond with a new instance only if the current instance of the data object on the server has an ETag that does not match the received ETag.

When the HTTP server or application server sends a data object with a Last-Modified indicator in the self entity, the Last-Modified indicator may be read by the runtime executable program, and cause the runtime executable program to control caching of the data object therewith. Specifically, the runtime executable program is caused to append the if-modified-since indicator to a subsequent message requesting a new version of a data object by the browser engine. The server is configured to respond to the message, by only serving a new instance of the data object if it has been modified since a date and time indicated in the if-modified-since indicator. In this manner, cached versions of data objects that are out of date may be updated when new versions are available.

Similarly, the presence of a max-age indicator in a self entity of a data object may cause the runtime executable program to purge cached objects exceeding the age indicated in the max age indicator. If the runtime executable program needed to retrieve a data object that had been purged from the cache, the program would query the cache, determine no cached version was available, and then send a new request for the data object to the server. In this manner, the aging of cached data objects may be controlled.

At 1208, the method may include, at the HTTP server, sending an HTTP response including the data object to the requesting browser engine, for passage to a runtime executable environment associated with the browser engine. At 1210, the method may optionally include caching the data object at an intermediate networking device based upon HTTP cache controls contained in headers of the HTTP response.

At 1212, the method may further include, at the browser engine, receiving the HTTP response including the data object, and at 1214 caching the data object in a browser cache based on HTTP cache control information. At 1216, the method may include stripping from the data object all HTTP header data including HTTP cache control information and content type, and at 1218 passing the data object to a runtime executable environment, without HTTP cache control information or content type. While the HREF and URI are not part of the stripped HTTP headers, it will be appreciated this data is HTTP response data that also becomes decoupled from the data object itself as it is cached and or passed to other program modules by the browser engine.

The method may further include, at the runtime executable program in the runtime environment, receiving the data from the browser engine, reading the cache control information and content type from the self entity, and caching the data object based on cache control information in the self entity of the data object, as indicated at 1220. At 1222, the method may include, at the runtime executable program, sending a message to the server based upon the URI in the self entity. The message may be sent to the HTTP server program executed on the server, or to an application server program executed on the server.

At 1224, the method may further include, at the server, receiving a message from the runtime executable program executed in the runtime executable environment, the message including the URI of the self entity. At 1226, the method may further include, at the server, identifying an application state associated with the object based on the URI. At 1228, the method may further include, at the server, generating a stateful reply, based on the application state. By stateful reply, it will be understood that reply may contain information sufficient to represent the current application state. The application state of the system 100 is represented in the data objects themselves, and changes based upon user inputs, and program logic contained in the embedded program 1102 and application server 1110, and the data objects themselves are generated with data sufficient to represent the current state of the application for a particular user session. At 1230, the method includes, at the server, sending the reply to the runtime executable program in the runtime environment on the client computing device. It will be appreciated that typically steps 1224-1230 are executed at an HTTP server program executed on the server. However, alternatively, as schematically illustrated at 1224A-1230A, these steps may be performed at the application server program executed on the server, as discussed above.

The method may further include, at the runtime executable program in the runtime environment, receiving the reply, processing the reply as shown at 1232 and returning a result to the browser engine, as shown at 1234. At 1236, the method may include, at the browser, sending a command to render output to a display, which results in displaying the result on a display associated with the computing device.

The above described systems and methods may be utilized to communicate URI, content type, cache control information, and/or HREF of a data object downloaded from an HTTP server by a browser engine to a runtime executable program, to enable the runtime executable program to exchange information with a server in a REST compliant manner with knowledge of the application state represented by the data object.

The above systems and methods may be utilized to realize a complex, stateful system according to the REST HATEOAS architecture. Generally speaking, by clustering business rules and/or other logic associated with a particular resource around the associated resource server, each resource may be individually maintained while still providing for instantiation of inter-resource relationships. For example, such a configuration may enable the provision of complex forms including a plurality of interrelated selectors. Further, as each resource server is substantially independent of the other resource servers, such a configuration may provide greater extensibility by enabling resource-granular updating of the logic. Yet further, by implementing the complex logic within the server as opposed to the clients, the described systems may potentially allow for lighter-weight client(s) as compared to typical client-server systems.

The above systems and methods may be further usable to provide streamlined mechanisms for handling network-based state transitions. For example, by providing a follow location handler configured to selectively intercept information so as to programmatically affect further requests to a server, a single request may be provided to both effect a state change and retrieve an updated object without defining any specialized instructions.

The above systems and methods may be yet further usable to provide workflow control over network-based state transition workflows. For example, by providing an extensible linking schema including stop condition links, control over a global state transition workflow may be affected by the various, independent link resource servers without compromising the tenants of the REST HATEOAS architecture.

As discussed above one of the problems with a REST API is that resource state is not normally pushed to the client. In other words, the client must query the resource for the resource state as required. Thus, the client is limited to only the cacheability information provided by the REST microkernel to determine the accuracy of cached resource representations. The client must thus depend on the length of time the resource representation has been in the cache, max-age, to determine if a new request to the resource server must be made for an updated representation.

Figure 13:
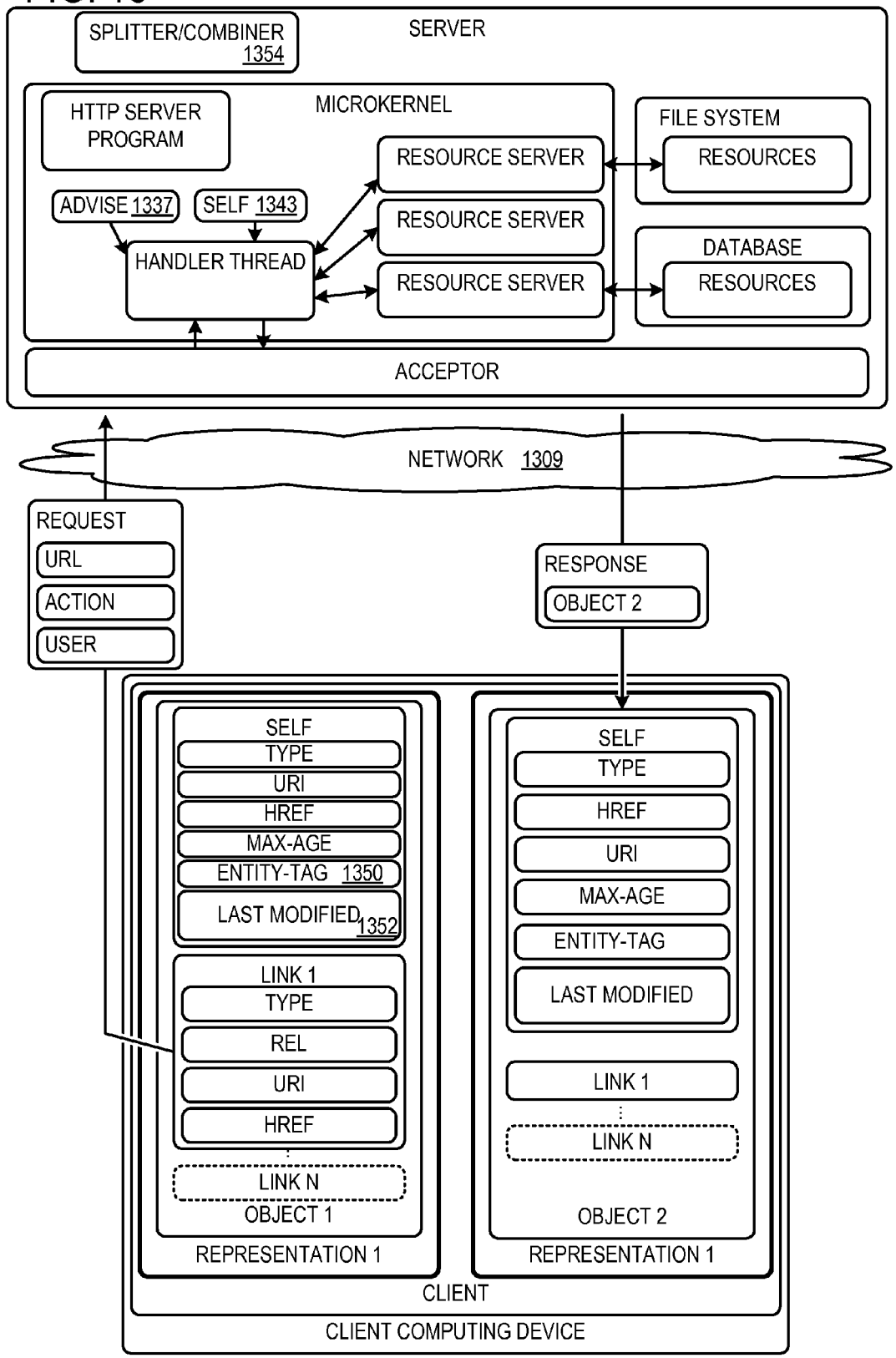
FIG. 13 shows a non-limiting example of a REST HATEOAS server platform in accordance with an embodiment of the present disclosure.

In order to increase the efficiency of the REST API, the cacheablity information available to the REST microkernel is expanded to include entity-tags (ETag) 1350 and last-modified properties 1352, illustrated in FIG. 13. This allows the microkernel to engage conditional logic to more efficiently manage resource requests from the client. The REST microkernel manages the expanded cacheability information using the SELF operation.

The SELF operation 1343 provides a mechanism whereby the microkernel can issue a request for just the cacheability information about a resource without requesting the entire resource representation. Upon issuing the SELF operation to a destination resource, the HTTP server program may receive on a subsequent READ operation self entity data of the destination resource. The self entity data may include the resource URL, content type, max-age, entity-tag, and last modified data of the destination resource. In other words, the SELF operation 1343 will return just the "self" portion of the resource representation, which can then be used to engage the http cacheability mechanisms of HTTP entity-tags ("ETags") and 'if-modified-since' GET requests. It will be appreciated that ETags are a mechanism that HTTP provides for web cache http://en.wikipedia.org/wiki/Web_cache validation and may either be strong validation or weak validation ETags. An example of a strong ETag may be "686897696a7c876b7e" whereas a weak ETag would be W/ "686897696a7c876b7e", which is distinguished by a W/ preceding the ETag value. The client may then use an ETag to issue conditional resource requests. This allows caches to be more efficient, and saves bandwidth, as a web server may not send a full response if the content has not changed. Sending a GET request with "if-modified-since:date" conditional logic causes the server to respond with the requested resource if it has been modified. The expectation is that resource server implementations could process the SELF operation quickly and efficiently versus fetching the entire representation.

FIG. 18 illustrates a process flow 1800 for cache control by a REST HATEOAS microkernel. The client 1802 initiates a resource request 1808 to microkernel 1804. Microkernel 1804 issues a GET resource operation 1810 to the resource server 1806. At 1812 of process flow 1800, the resource server 1806 generates a resource representation and at 1814 sends the resource representation to the microkernel 1804. The resource representation sent to the microkernel includes the self entity data (with ETags and last modified data) described above. As discussed above microkernel 1804 will also recognize the expanded self entity data including last-modified and entity-tag information. At 1816, process flow 1800 includes the microkernel 1804 forwarding the resource representation and expanded self entity data to client 1802. At 1818, process flow 1800 includes client 1802 caching the resource representation.

On a subsequent request for resource, client 1802 may issue a conditional resource request 1820 to microkernel 1804. Conditional resource request 1820 may be an "if modified since" type of conditional request or any other suitable conditional request based upon the cacheability information from the self entity data. Upon receipt of the conditional resource request microkernel 1804 may initiate SELF operation 1822 to resource server 1806. At 1824, process flow 1800 includes resource server 1806 returning only the resource self entity data to microkernel 1804. Upon receipt of the self entity data, microkernel 1804 may engage cache control logic steps 1826, 1828, and 1830. At 1826, process flow 1800 includes microkernel 1804 checking the condition of the resource by comparing the self entity data included in the resource representation sent by the resource at 1814 to the self entity data returned by the resource at 1824. If the condition check at 1826 results in the condition not being met, process flow 1800 continues to 1828.

At 1832 process flow 1800 includes microkernel 1804 issuing a notification to client 1802 that the cached representation of the resource is still valid. At 1834, process flow 1800 includes client 1802 using the cached representation of the resource. If the condition check at 1826 results in the condition being met, process flow 1800 proceeds to 1830. At 1836 process flow 1800 includes microkernel 1804 issuing a get resource operation to resource server 1806. At 1838, process flow 1800 includes resource server 1806 generating a new resource representation. At 1840, process flow 1800 include resource server 1806 sending the new resource representation to microkernel 1804 which forwards the new resource representation to client 1802 at 1842.

Now turning to FIG. 13 which shows a representative embodiment of a REST HATEOAS server system with the additional SELF and ADVISE operations and the splitter/combiner agent 1354. The REST HATEOAS server depicted in FIG. 13 is typically an electronic commerce server, but may also be any other REST server platform. Elements previously described above in relation to FIG. 1 will not be described again for the sake of brevity. In this embodiment, the microkernel may perform the SELF operation 1343 and the ADVISE operation 1337 in response to certain operating conditions.

Figure 17:
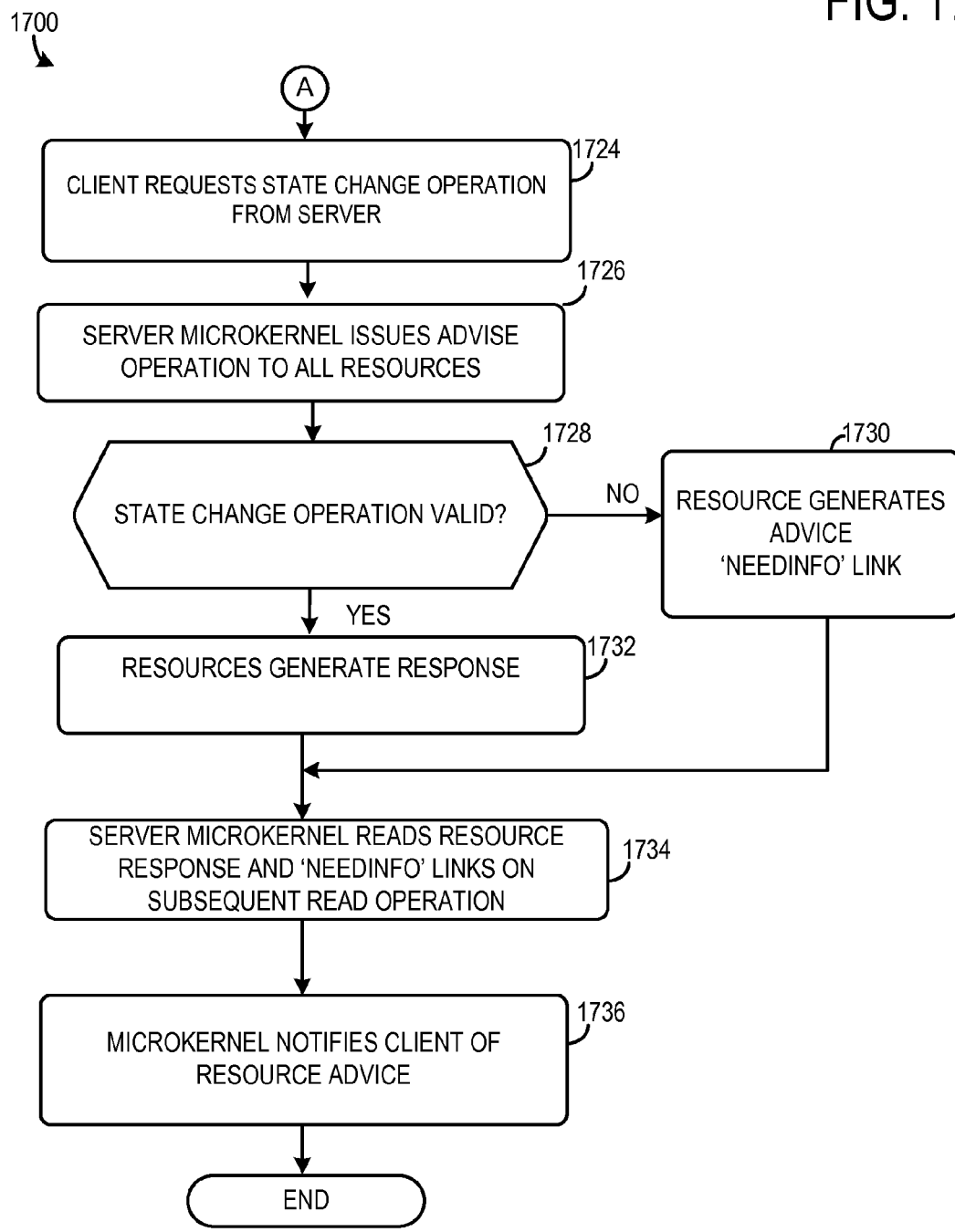
FIG. 17 shows a flowchart illustrating a method of representing a state change of a resource to a client via a computer network, providing an advisory functionality in accordance with an embodiment of the present disclosure.

FIG. 17 shows a flowchart 1700 illustrating a method of representing a state change of a resource to a client via a computer network, providing an advisory functionality in accordance with an embodiment of the present disclosure. In this example, upon receiving the HTTP request for the resource operation from the HTTP client program, the HTTP server program may send an ADVISE operation to a resource indicated by the HTTP request where the ADVISE operation indicates a query for validity of the resource operation on the resource. Upon receiving the ADVISE operation from the HTTP server program, the resource may determine if the resource operation is valid and if the resource operation is not valid, generate an advice link advising the microkernel of the not valid resource operation and send the advice link to the microkernel. If the resource operation is not valid, the HTTP server program may receive from the resource an advice link indicating the not valid resource operation. Further, the advice link may include a request for additional information from the HTTP client program.

At block 1724 a state change operation is issued by the client to the microkernel (CREATE, DELETE, UPDATE). At block 1726 the microkernel will first issue an ADVISE operation to all the resources to see if any of them have "advice" for this state change. At block 1728, the resources will determine if the state change operation is valid. If the state change is valid, the process continues to block 1732 where each resource will generate the appropriate response to the state change operation. If a resource determines the state change operation is not valid, the process proceeds to block 1730 and a 'needinfo' link advice is generated. At block 1734, the microkernel reads each resource and obtains the resource response and any resource advice and notifies the client of any resource advice at block 1736.

The advice link can be warnings, which mean the operation can go through, but with qualifications. For instance, the shipping resource can advise that a shipping fee will be required. This advice will show up as a 'needinfo' link on a subsequent READ operation of the modified resource. In other instances, the advice link may include advising the HTTP server program to send a request for additional information to the client. The advice can also be a stop condition that means the state change cannot go through. For instance, a customer wishes to purchase two tickets to an event. Furthermore, the customer desires for the two tickets be seated together. As the customer browses the available seats, the microkernel issues an ADVISE operation to the ticketing resource. As the customer selects the seats and adds them to the cart, a state change occurs at the ticketing resource (another customer purchases one of the desired seats) and one of the two seats is no longer available. The ticketing resource will generate a 'needinfo' link to advise a stop. The API caller will then send notification to the client which will provide the message to the customer. By providing the customer with a message that the desired seats are unavailable, the customer avoids the possibility of being informed after initiating the payment process that the seats are unavailable. Thus, the customer is provided with the most up-to-date information about seating availability, allowing the customer to make another selection at the earliest opportunity in the process which allows the customer to make the most informed choices based upon the current state of the resource.

Figure 14:
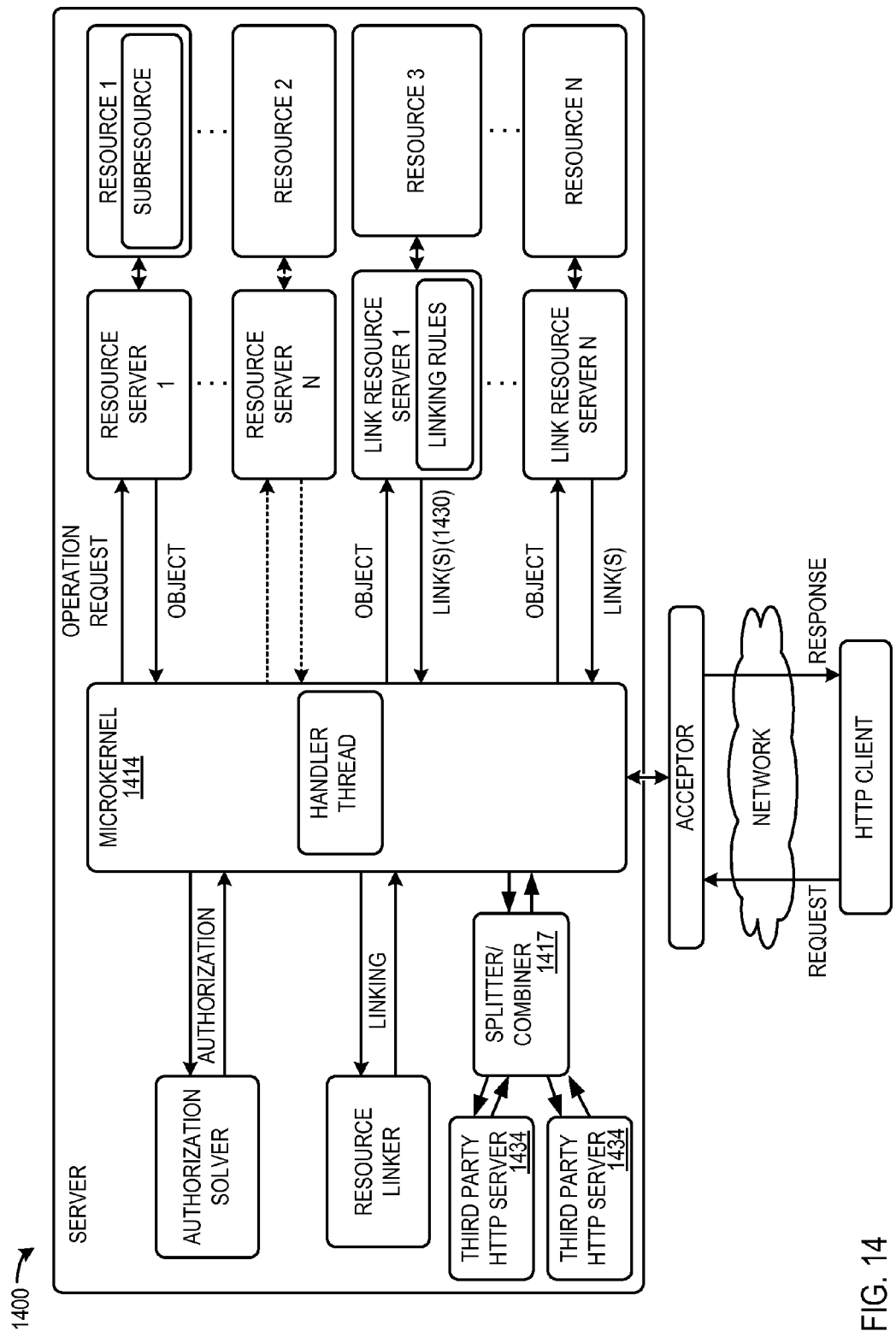
FIG. 14 shows a non-limiting example of a REST HATEOAS microkernel in accordance with an embodiment of the present disclosure.

FIG. 14 shows a non-limiting example of a HATEOAS microkernel in accordance with an embodiment of the present disclosure. The microkernel 1414 comprises a microkernel, an authorization solver 1416, a resource linker 1418, one or more resource servers 1420 and splitter/combiner agent 1417. The microkernel is the "central communications hub" and is therefore configured to interact with the remaining elements of the microkernel 1415. The resource servers 1420 are isolated modules configured to interact with the each other by exchanging (sending and/or receiving) resource operations via the microkernel.

HATEOAS systems by design are typically unaware of the concept of "users". Accordingly, the authorization solver 1416 allows the microkernel to provide the user authentication needed for the HATEOAS architecture. After the microkernel 1414 receives a resource operation 1426 from one of the resource servers 1420, the microkernel may be configured to communicate with the authorization solver 1416 to ensure that the given resource operation is authorized. For example, the microkernel may forward the resource operation request to the authorization solver 1416. In other embodiments, the microkernel may forward a subset of the resource operation request data.

The resource linker 1418 is configured to link any associated information from each of resource servers 1420 with the requested resource operation 1426. As a resource server is building the representation, the linking process in conjunction with authorization, makes the representation available to each of the other resource servers 1420. Other resource servers then can add links with additional information. For example, in an e-commerce system, if a user requests to view a resource featuring an online catalog entry including description, price, and inventory available for a product, then in response to the customer's request the client issues a request to the microkernel which processes and validates the request and then forwards the request to the proper catalog resource server.

The catalog resource server can then create a catalog item representation and return the representation to the electronic commerce server. At the electronic commerce server, the microkernel performs the linking process making this representation available for other resource servers, including a price resource server, an inventory resource server, and a product description resource server. Each of these resource servers, in turn, may examine the representation, and respond to any relevant links therein. Thus, the representation may be augmented with price data returned by the price resource server, inventory data returned by the inventory server, and description data returned by the product description server. The result of such linking, as discussed above in reference to FIG. 13, is stored within the resource representation, and eventually returned to the requesting client.

As discussed in the Background, it is becoming increasingly necessary to merge multiple systems behind the same Business API. This allows the same client to interact with different backend commerce systems without even knowing about them. As an example, this is true of an e-commerce platform that provides both physical and digital goods. To accomplish this, a variation of the REST microkernel that includes an entity called the splitter/combiner agent 1417 is used. The splitter/combiner agent allows the microkernel 1414 to examine an operation and split it, send it to one or more third party servers 1434 for processing. Servers 1434 may be, for example, HTTP servers, or other types of servers. The results are then combined into one result by the splitter/combiner agent and returned to the client.

Therefore upon receiving an HTTP request, a splitter/combiner agent of the HTTP server program may split an HTTP request including a plurality of resource operations into a plurality of individual resource operations. In this example, the plurality of resource representations may include at least one resource representation served by a third party resource server. The splitter/combiner agent may split the plurality of resource representations requested by the HTTP request into individual requests for resource representations. It will be appreciated that the individual requests for resource representations may be for resources served by third party resource servers, local resource servers, or any combination thereof. For each of the plurality of resource representations including at least one resource representation from the third party resource server, the HTTP server program may determine a destination URL, determine a content type at the destination URL from a content type header of the HTTP request, and retrieve an existing resource representation. The retrieved existing resource representations may be sent to the splitter/combiner agent to be combined into a combined resource representation. The combined resource representation may be a single resource representation composed of each of the plurality of retrieved existing resource representations. The splitter/combiner agent may send the combined resource representation to the server microkernel which in turn may send the combined resource representation to the client program.

Each third party resource server may provide a unique functionality and representation of resources within its respective API. In order to provide a unified resource representation to the client, the Business API must combine the resource representations from each third party resource server. Splitter/combiner agent 1417 functions to provide a normalized resource representation to the client independent of the API specific resource representation provided by the third party resource server. Splitter/combiner agent 1417 may translate representations from each third party server into a combinable representation. Subsequently, splitter/combiner agent 1417 may then merge these representations into a single representation for the Business API.

Furthermore, the splitter/combiner agent may also function to sort elements of a request from the Business API and send the request to the appropriate third party resource server. In this case, splitter/combiner agent 1417 receives the resource request from the Business API, splits the request into individual elements for each third party resource server, translates each element into a compatible format for each third party resource server API and then sends each request to the appropriate third party resource server. As discussed above the elements of FIG. 14 that were previously described in the discussion of FIG. 2 will not be described again.

As a non-limiting example, a customer wishes to purchase a new smart phone. The client issues the request to the electronic commerce server. The electronic commerce server processes the request and forwards the request to the resource server to generate a catalog of available smart phones. The catalog representation is returned to the server where the microkernel performs linking operations which include links to mobile phone service providers and smart phone accessories. The links may then be used by the servers for the mobile service providers which may then return representations detailing their available service plans. At the same time, the servers for accessory providers may also provide representations of the available accessories for the phones offered by the smart phone resource server. The splitter/combiner agent then combines the representation from the multiple resource servers into a composite representation. The composite representation returned the client by the electronic commerce server is a single representation of the available smart phones, service providers/service plans, and available accessories for each model of smart phone. After the customer has selected a new smart phone, service plan and accessories, the request is returned to the electronic commerce server where the microkernel, via the splitter/combiner agent, splits the request and sends the appropriate request to each appropriate resource server. Thus, the customer is provided with a unified smart phone shopping experience.

Thus, the splitter/combiner agent allows the REST microkernel to manage communications between multiple third party servers while maintaining a single channel of communication, the Business API, with the client.

In this configuration, the REST microkernel and Business API must efficiently communicate with the multiple third party servers which may each have their own unique business API and thus different requirements for interfacing. Thus, the splitter/combiner agent may be configured as a configurable implementation layer interfacing an API of the stateless microkernel architecture HTTP server program and an API of each of the one or more third party HTTP server devices. In an example embodiment, the splitter/combiner agent may include a first application programming interface implementation layer configured to interface with the stateless microkernel of the HTTP enterprise commerce server program and a second modifiable application programming interface implementation layer configured to interface with one or more third party server devices. This first API implementation layer and modifiable second API implementation layer configuration may be such that a modification of the second API implementation layer does not include a modification to the first API implementation layer.

The advantage provided by the splitter/combiner agent of the microkernel is a means to add, replace and remove supporting microkernel integrations at will without changes to the Business API. Returning to the example above, the electronic commerce server will interface multiple resource servers to provide the customer with available smartphones, service providers/plans, and smartphone accessories. Each resource server may have its own API which may differ from the Business API of the electronic commerce server. These differences may require extensive revision to the Business API to ensure proper communication and a fluid shopping experience for the customer. Thus, each additional resource server may require additional modification of the Business API adds additional expense and furthermore, the modifications of Business API may not be compatible with each other. The possibility of incompatibilities may force the owner of the electronic commerce server to make decisions based upon the compatibility and cost of the required modifications required to interface with each third party resource server.

FIG. 15 shows a process flow depicting an embodiment of a method for retrieving an accurate representation of a resource through the use of a State Model. Two seemingly different requirements of the REST Microkernel are addressed with the State Model component: READ performance and representation personalization.

The REST Microkernel has stringent performance and reliability requirements that are difficult to meet if each READ/SELF operation is sent to a resource server. The State Model stores the results of previous READ/SELF operations and re-vends them to comparable READ/SELF requests. While abstractly similar to a standard data cache, the State Model has additional aspects that enable the microkernel to accurately supply accurate representations to clients in a timely manner.

Each client that connects to the REST microkernel is identified by various pieces of user information like a user's roles, ID, locale, currency and other personal information. In some cases, additional personalization aspects like gender, age and location are associated with the specific client. This practice, known as "personalization", is used in ecommerce and search applications. Individually these pieces of data are called attributes.

The State Model may make use of the client attributes to provide personalized representations of resources. FIGS. 15A and 15B are illustrations of a process flow 1500 in which the State Model makes use of client attributes to deliver a resource representation based upon the provided attributes and the resource attributes of interest.

Process flow 1500 illustrates a method for serving enterprise commerce between a stateless microkernel architecture HTTP server program executed on a server device and an HTTP client program executed on a client computing device using the state model. In summary, upon receiving an HTTP request including a plurality of client attributes and a plurality of resource operations from an HTTP client program via a computer network, the HTTP server may read the plurality of client attributes included in the HTTP request. At the splitter/combiner agent, the HTTP request may be split into a plurality of individual resource operations. For each resource operation, the stateless microkernel architecture HTTP server program may determine a destination URL and determine a content type at the destination URL from a content type header of the HTTP request. The plurality of client attributes may be compared to a stored client attribute profile. If the plurality of client attributes match a stored client attribute profile associated with an existing resource representation, the existing resource representation may be retrieved. The retrieved resource representation may be sent to the splitter/combiner agent. Upon receipt of a last retrieved resource operation corresponding to a last of the plurality of individual resource operations, the splitter/combiner agent may combine each retrieved resource representation into a combined resource representation. The HTTP server program may send the combined resource representation to the HTTP client program via the computer network.

If the plurality of client attributes do not match a stored client attribute profile associated with an existing resource representation, then the HTTP server program may determine a user identifier associated with the HTTP request for the resource operation and an action of the resource operation to be undertaken on the resource. The HTTP server may query an authorization solver to determine whether the user is authorized to perform the requested action of the HTTP request on the resource and if the resource operation is authorized, send the resource operation to a resource server associated with the resource and receive result of resource operation. The resource operation may be a GET, POST, DELETE, PUT, SELF, or ADVISE operation and include adding, retrieving, deleting the resource from a file system or database, or programmatically generating the resource. If the action is authorized, the HTTP server program may send the result of the resource operation to a linker for link processing. The result of the resource operation may be sent to the splitter/combiner agent. Upon receiving a last result of the resource operation corresponding to a last of the plurality of individual resource operations, the results of the resource operations may be combined into a combined resource representation and sent to the requesting HTTP client program via the computer network. It will be appreciated that the one or more resources may be served by one or more of local resource servers or third party HTTP servers.

In a second embodiment, process flow 1500 may be implemented by stateless microkernel architecture HTTP enterprise commerce program executed on a server device. The stateless microkernel architecture HTTP enterprise commerce server device may include a plurality of resource servers each of the plurality of resource servers provided by a resource and including one or more object servers and one or more link resource servers and a stateless microkernel. The stateless microkernel architecture HTTP enterprise server program executed on a server device may execute process flow 1500 as described above.

In a third embodiment, process flow 1500 may be implemented by a stateless microkernel architecture HTTP enterprise commerce server including a stateless microkernel including the splitter/combiner agent.

Process flow 1500 will now be discussed in further detail as illustrated in FIGS. 15A and 15B.

Turning first to FIG. 15A, process flow 1500 begins upon the request of a page from the e-commerce server by a client program 1550 at block 1502, the microkernel 1552 receives the page request/HTTP request at block 1504. At 1506, microkernel 1552 reads the client attributes from the client page request. At 1508, microkernel 1552 determines if there are multiple resource operations within the client page request. If there are not multiple resource operations included in the client page request, process flow 1500 proceeds to 1512. If there are multiple resource operations in the client page request, microkernel 1552 may split the client page request into individual resource operations using the splitter/combiner agent at 1510. At 1512, microkernel 1552 determines a destination URL and a content type from a content type header of the client page request. At 1514 and 1516, the client attributes may be to a stored client's attribute profile associated with existing representations of the page. If the client attributes match a stored client attribute profile associated with an existing representation of the page, microkernel 1552 may retrieve an existing representation of the page at 1518. If the provided client attributes do not match an attribute profile associated with an existing representation of the page, process flow 1500 continues to 1528. At 1520, microkernel 1552 may send the existing representation to the splitter/combiner agent. At 1522, microkernel 1552 may determine if the existing resource representation sent to the splitter/combiner agent is a last of the plurality of individual resource operations associated with the client page request. If microkernel 1552 determines that the sent existing page representation is not associated with a last of the plurality of resource operations of the client page request, process flow 1500 returns to 1512. Upon receipt of the last existing resource representation, the splitter/combiner agent may combine each representation into a combined resource representation of the page and send the combined resource representation of the page at 1524. At 1526, client program 1550 receives the combined resource representation.

Turning now to FIG. 15B, at 1528 microkernel 1552 may determine a user identifier associated with the client page request. At 1530, process flow 1500 includes determining an action of the resource operation. At 1532, microkernel 1552 may query an authorization solver which may determine if the resource operation is authorized at 1534. If the resource operation is not authorized microkernel 1552 may return an authorization failure message. If the resource operation is authorized, microkernel 1552 may send the resource operation to the resource at 1536. At 1537, resource 1554 perform the resource operation. At 1538, microkernel 1554 receives the results of the resource operation and sends the result of the resource operation to a linker for link processing at 1540. At 1542 microkernel 1554 may send the result of the resource operation to the splitter/combiner agent. At 1544, microkernel 1552 may determine if the result of the resource operation sent to the splitter/combiner agent is a last of the plurality of individual resource operations associated with the client page request. If microkernel 1552 determines that the sent result of the resource operation is not associated with a last of the plurality of resource operations of the client page request, process flow 1500 returns to 1530. Upon receipt of the last result of a resource operation, the splitter/combiner agent may combine each result of a resource operation into a combined resource representation of the page and send the combined resource representation of the page at 1546. At 1548, client program 1550 receives the combined resource representation.

It will be appreciated that the combined resource representation sent at 1524 and 1546 of process flow 1500 may include both retrieved existing page representations and results of resource operations. It will be further appreciated that for each result of a resource operation, microkernel 1552 may store the representation and associated attributes in a local cache before sending the representation to the client.

For instance, if a client's locale is identified as 'fr-ca', then the user would expect the displayed resource representations to be in French, preferably Canadian French. A microkernel employing the State Model may then use the locale to identify a stored Canadian French representation to return to the client. If no such representation exists in storage, the microkernel may retrieve a Canadian French representation if provided by the resource.

In the State Model, the resources provide the set of attributes that are relevant for 'personalizing' the representation for the client. If locale is the differentiator, then the resource will return a French description of a resource, along with the locale attribute "fr". The resource may also return a different representation of the exact same resource in another language, for example, English with a locale attribute "en". The resource can further specialize the attribute further specifying the locale attribute to the client region. For example, the locale attribute may be "en_us" for an English language client located within the United States or "en_ca" for a client located within Canada.

In the example above, client locale is used as a filtering aspect for the resource representation. Other attributes, including but not limited to gender, age, other customer information of interest, or any combination thereof may be used as a filtering aspect of the chosen representation. By utilizing these attributes as a filter, the State Model can provide the correct, though different, representation of a resource identified by a singular URI. For example, the French and English versions of '/items/id' share the same URI.

This differs from current APIs which do not have a State Model or client attribute which place the burden of identifying the right language on the client, usually by making them encode the relevant aspect in the URI. For example, URI for an English language resource representation would be encoded as follows: '/items/id/en' or '/items/id?language=en'.

In another application of the State Model, a plurality of attributes such as gender and age can be collected from the user at an appropriate time, with an explanation of how they would be used. For example, the user may include attribute information of interest during a registration step or may self-identify attributes upon request by the resource, e.g., pull down menus on a "welcome" page.

By using personalization attributes as filters to re-vend existing representations to new clients, the State Model addresses the performance requirements of a cache while ensuring that each client receives personalized data for a given resource.

Figure 16:
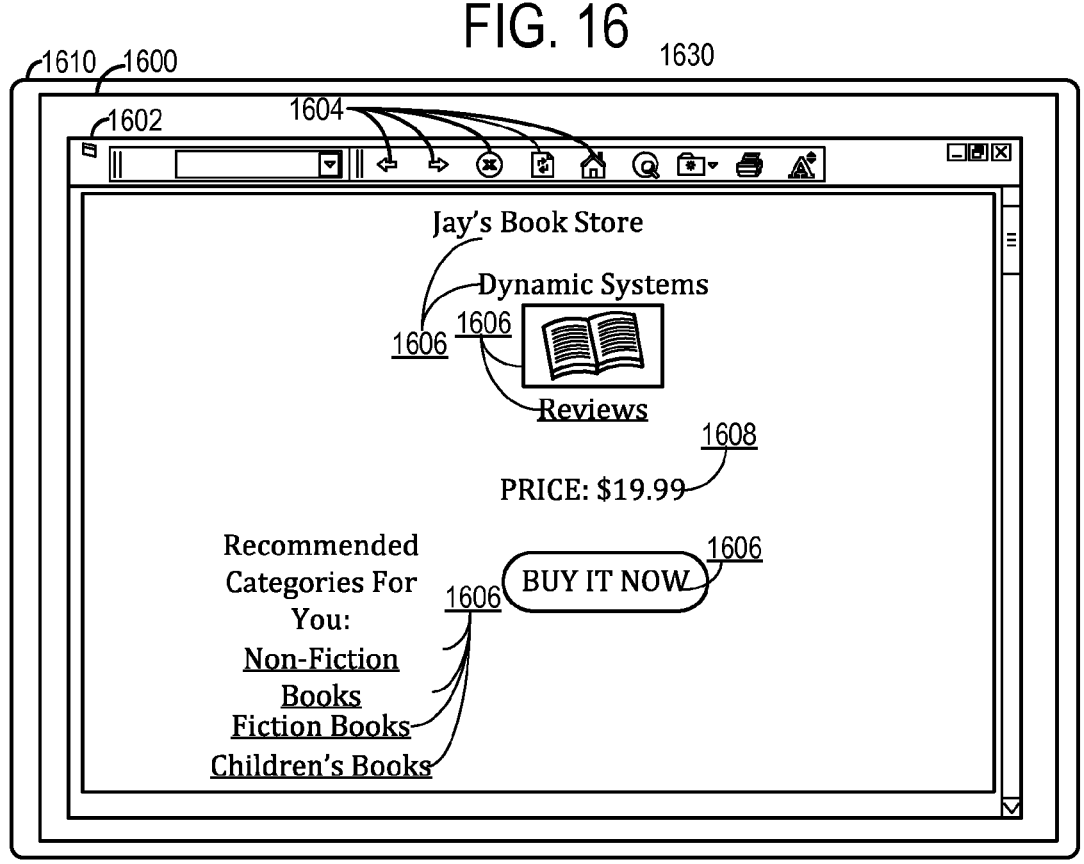
FIG. 16 shows a non-limiting example of a client display of a resource in accordance with an embodiment of the present disclosure.

FIG. 16 shows a non-limiting example of a client display of a resource using the State Model described above. FIG. 16 shows an example graphical user interface (GUI) 1600 presented on a display 1610 of client device 1630 that may be generated via the client program 1550 (e.g., web-browser) of FIG. 15. FIG. 16 illustrates graphical content that may be presented in response to actions described above in process flow 1500. Therefore, process flow 1500 and FIG. 16 are jointly described. As shown a browser window 1602 presented in the GUI 1600 includes various tools 1604 providing navigation in a network such as the Internet as well as other functionalities. The functions of the tools may include but are not limited to navigation to a home page, both forward and backward navigation through web pages, refreshing of a web page, searching, etc. The GUI 1600 and tools 1604 may be utilized by the user of client device 1630 to initiate a page request for Jay's Bookstore. The client device 1630 includes in the browser request client attributes describing the user to the microkernel 1552 of the electronic commerce server as described above. Microkernel 1552 may then compare the client attributes to existing representations of the Jay's Bookstore resource and return a matching representation or request a new representation from the resource server. In this case page elements 1606 and purchase price 1608 may be determined by evaluation of the client attributes of interest by the resource server.

Process flow 1500 concludes at block 1512 where upon receipt of the resource representation, the GUI 1600 display contains personalized page elements 1606 and purchase price 1608 based upon the client attributes.

REST currently follows the Client-Server architecture characterized by the control of information flow. The client initiates a call to the server, which processes the request. The server formulates a response and sends it back to the client. The client processes the response and then may issue follow-on requests.

A variation on this is the "asynchronous" call-response architecture, where the client initiates a request but does not wait for a response. Instead, the server calls the client back when a response is ready for consumption. The advantage of this model is that the client does not have to wait for the server to respond. A disadvantage is that the client has to track each request and subsequent response from the server which increases the processing load and resources required by the client.

Neither of these variations of Client-Server architecture solves the problem of State Mismatch. We have applied a different architecture to the REST System design called publish/subscribe (Pub/Sub) for short. In this model illustrated in process flow 1900 of FIG. 19, the stateless microkernel architecture HTTP server program may include a publish/subscribe agent. At 1908, an HTTP client program 1902 may subscribe to a specific resource 1906. Microkernel 1904 may receive the subscribe request for a specific resource 1906 from the HTTP client program 1902 and at 1910 monitor specific resource 1906 for a change in state. Upon a change in state of the resource at 1912, the publish/subscribe agent may receive a notification of the change of state at 1914. Microkernel 1904 may retrieve a modified representation of the resource at 1916. Resource 1906 may generate a new resource representation at 1918 and send the new resource representation to microkernel 1904 at 1920. At 1922, microkernel 1904 may send the modified representation of the resource to the HTTP client program 1902. The publish/subscribe agent of the HTTP server may thus be configured to allow the client to subscribe to a channel and to receive events when the state of the channel changes. When the state of a channel changes, this initiates an event out to whatever subscribers exist for that event.

As an example, suppose that a customer is shopping for furniture. The customer may begin browsing and selecting various pieces and styles of furniture. The customer's relatives may also want to purchase items for the customer. The Pub/Sub design allows the customer and his or her relatives to subscribe to a queue created by the customer which tracks the customer's selected and purchased furniture. The customer's relatives may then subscribe to the queue. The customer's relatives may then track what has been purchased by and for the customer as well as the customer's desired pieces and style of furniture through the publish operation. In this example, each purchased piece of furniture and each selection of furniture by the customer will result in a state change of the resource. These state changes will result in notification of the subscribers by the publish operation. The Pub/Sub design provides the advantage of notifying each individual subscriber of the queue of state changes allowing each subscriber to make informed purchases, e.g., avoiding duplicate purchases, thus improving the customer experience.

In the REST System, these channels are identified by the resource URI allowing the previously described State Model to work with a resource Pub/Sub agent to send state changes from the server to the client as they occur. This dramatically reduces the State Mismatch problem.

The final deficiency described in the Background addresses the construction and implementation of the Business API. Construction and implementation of the Business API is a complex process involving multiple parties are working toward generating a working API for the business that delivers the functionalities desired by the business owner to customers using the API.

The disclosed API facilitates efficient communication during the development process. Furthermore, the resulting Business API has brought in a new participant in the development process, the business owner. Thus, the Business API must clearly express what the business owner wants to project in terms of capabilities and data and in a format that effectively communicates these terms to parties at each level of the development process.

The Business API Resource Definition document schema provides the business owner and the API developer an unambiguous method to communicate the functionality requirements and development status for the Business API. The Business API Resource Definition documents provide the advantage of allowing efficient management of the Business API development process to ensure that the requirements of the business owner are met and the customer is provided with a fully functional and gratifying engagement experience.

The Definitions documents support multiple contributors and are evaluated as a set, meaning each individual document contributes a portion of the Business API being developed. This approach is advantageous because it is common practice for multiple development teams to be employed to address individual API functionality tasks. Each development team will work individually on the assigned functionality and report the status of development via their respective Business API Definition document. Thus, the mechanism ensures that the different parties contributing to the API do not have to share document-editing duties as each party writes their own document and then submits their portion to the definition set.

Taken together, the entire Business API is fully defined by all the documents. Thus, all parties in the development process may use the Business API Definition documents to evaluate the development status of the entire API.

Another advantage imparted by this method is that often during the course of development additional functionalities may be requested by the business owner. This may be communicated to the development teams through the addition of Business API definition documents for the new functionality. This mechanism allows for Business API definitions to be added to without modifying the existing documents, thus communicating the required additions efficiently and without confusion.

An additional advantage of the Business API Definition document format is individual definition documents may refer to other elements defined in other documents without specifying the file defining the element. This eliminates the common "import" or "include" mechanisms found in other schema formats.

The definition documents may be composed in a variety of formats including, but not limited to XML, RTF, Markdown, HTML or any file format that can define nested hierarchical lists such as multi-level indentured lists. This utility of format is attributable to the very simple nature of the definition elements. The advantage of the multi-format approach addresses the varying levels of technical knowledge of the document writer. As an example, developers may be more comfortable writing XML or HTML definition documents, whereas business owners may be more comfortable writing definition documents with a word processor. In other words, the Business API Definition document schema facilitates efficient communication of the development process regardless of the level of technical knowledge.

The elements in the Definition format include the following:

resource-family: A grouping element to scope elements inside together. An example of a resource-family would be 'carts'.

resource: A particular 'endpoint' in the API that is addressable. An example would be 'cart-lineitem'. The resource has a URI definition as well as a list of actions provided. These actions include READ, UPDATE, DELETE, and CREATE.

plan: A step-by-step utilization of resources to accomplish a particular business goal. For example, the 'add-item-to-cart' plan defines the interaction and relationships between several resources: 'item', 'addtocart-form', 'cart-lineitems', and 'cart-lineitem'.

representation: A data description element that defines the properties in a representation. For instance, the 'price' representation has the fields 'list-price' and 'purchase-price'.

property: A key-value element that is used in representations. An example is 'list-price: cost'; 'list-price' is the key, and 'cost' is the value. The values can be entities as described below, or primitive data like numbers and strings. The primitive data can have a variety of validation parameters including range and regex patterns.

entity: A data definition element that describes an object. Entities are used in representation elements to describe non-primitive data. An example is 'cost' which has several properties like 'currency', 'amount', and 'display-value'.

The elements in the definition documents have traceability requirements to ensure that all elements are used correctly. A nonlimiting traceability requirement is that referred elements will be defined in the document set. For instance, a property named 'list-price' utilized in a representation must be defined in any one of the documents in the definition set. Elements cannot be defined more than once.

Another traceability validation is that all resources must be used in at least one plan. Additionally, each action provided by a resource must be used in at least one plan. The importance of this validation is to ensure that the resources built by the developers meet a business goal in the Business API. This helps the organization test their actual implementation of the API against the Business API contract. If a resource exists in the product, but is not referred to in the Business API plans, then that extraneous resource may be questioned and removed.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method for serving enterprise commerce between a stateless microkernel architecture HTTP server program executed on a server device and an HTTP client program executed on a client computing device, comprising:
at the HTTP server program executed on the server device:
receiving an HTTP request including a plurality of client attributes and a plurality of resource operations from an HTTP client program via a computer network, wherein each of the plurality of resource operations is performed on one of a plurality of resources;
reading the plurality of client attributes included in the HTTP request;
at a splitter/combiner agent of the HTTP server program, splitting the HTTP request into a plurality of individual resource operations, wherein the splitter/combiner agent comprises an application programming interface between the stateless microkernel architecture enterprise commerce server program and one or more third party resource server devices, wherein the splitter/combiner agent includes a first application programming interface implementation layer configured to interface with the stateless microkernel of the HTTP enterprise commerce server program and a second modifiable application programming interface implementation layer configured to interface with the one or more third party resource servers;
for each of the plurality of individual resource operations:
determining a destination URL;
determining a content type at the destination URL from a content type header of the HTTP request;
comparing the client attributes to a stored client attribute profile;
if the plurality of client attributes match a stored client attribute profile associated with an existing resource representation, then:
retrieving the existing resource representation matching the plurality of client attributes retrieved from the HTTP request; and
sending the retrieved existing resource representation to the splitter/combiner agent;
upon receiving a last retrieved resource representation corresponding to a last of the plurality of individual resource operations of the HTTP request at the splitter/combiner agent, combining each retrieved resource representation into a combined resource representation; and
sending the combined resource representation to the requesting HTTP client program via the computer network.

2. The method of claim 1, further comprising:
if the client attributes do not match a stored client attribute profile associated with an existing resource representation, then:
determining a user identifier associated with the HTTP request for the resource operation;
determining an action of the resource operation to be undertaken on the resource;
querying an authorization solver to determine whether the user is authorized to perform the requested action of the HTTP request on the resource;
if the resource operation is authorized then, sending the resource operation to a resource server associated with the resource, wherein the resource operation is a GET, POST, DELETE, PUT, SELF, or ADVISE operation and includes adding, retrieving, or deleting the resource from a file system or database, or programmatically generating the resource;
receiving the result of the resource operation;
sending the result of the resource operation to a linker for link processing; and
sending the result of the resource operation to the splitter/combiner agent; upon receiving a last result of the resource operation corresponding to a last of the one or more resource operations of the HTTP request at the splitter/combiner agent, combining each retrieved resource representation into a combined resource representation; and
sending the combined resource representation to the requesting HTTP client program via the computer network.

3. The method of claim 2, wherein upon issuing the SELF operation to a destination resource, receiving on a subsequent READ operation self entity data of the destination resource, the self entity data comprising the resource URL, content type, max-age, entity-tag, and last modified data comprise self entity data in the destination resource.

4. The method of claim 2, further comprising the HTTP server program upon receiving the HTTP request:
sending an ADVISE operation to a resource indicated by the HTTP request, the ADVISE operation indicating a query for validity of the resource operation on the resource; and
if the resource operation is not valid, receiving from the resource an advice link indicating the not valid resource operation.

5. The method of claim 4, further comprising the resource upon receiving the ADVISE operation:
determining if the resource operation is valid; and
if the resource operation is not valid, generating an advice link advising the microkernel of the not valid resource operation and sending the advice link to the microkernel.

6. The method of claim 5, wherein the advice link includes a request for additional information from the HTTP client program.

7. The method of claim 1, wherein the stateless microkernel architecture HTTP server program includes a publish/subscribe agent, the publish/subscribe agent including:
receiving a subscribe request for a specific resource from the client;
monitoring the specific resource of a change in state of the resource;
upon the change in the state of the resource, retrieve a modified representation of the resource; and sending the HTTP client program the modified representation of the resource upon a state change of the resource.

8. The method of claim 1, wherein the one or more resources are served by one or more of local resource server devices or third party HTTP server devices.

9. The method of claim 1,
wherein the second application programming interface implementation layer is configured to be modifiable such that a modification of the second application programming interface implementation layer does not include a modification to the first application programming interface implementation layer.

10. A server device executing a stateless microkernel architecture HTTP enterprise commerce server program, the server device comprising:
a processor configured to execute:
a plurality of resource servers, each of the plurality of resource servers provided by a resource and including one or more object servers and one or more link resource servers;
a stateless microkernel configured to: receive an HTTP request including a plurality of client attributes and a plurality of resource operations from an HTTP client program via a computer network, wherein each of the plurality of resource operations is performed on one of the plurality of resources;
read the plurality of client attributes included in the HTTP request;
at a splitter/combiner agent of the HTTP server program, split the HTTP request into a plurality of individual resource operations, wherein the splitter/combiner agent comprises an application programming interface between the stateless microkernel architecture enterprise commerce server program and one or more third party resource server devices, wherein the splitter/combiner agent includes a first application programming interface implementation layer configured to interface with the stateless microkernel of the HTTP enterprise commerce server program and a second modifiable application programming interface implementation layer configured to interface with the one or more third party resource servers;
for each of the plurality of individual resource operations:
determine a destination URL;
determine a content type at the destination URL from a content type header of the HTTP request;
compare the client attributes to a stored client attribute profile;
if the plurality of client attributes match a stored client attribute profile associated with an existing resource representation, then:
retrieve the existing resource representation matching the plurality of client attributes retrieved from the HTTP request; and
send the retrieved existing resource representation to the splitter/combiner agent;
upon receiving a last retrieved resource representation corresponding to a last of the plurality of individual resource operations of the HTTP request at the splitter/combiner agent, combine each retrieved resource representation into a combined resource representation; and
send the combined resource representation to the requesting HTTP client program via the computer network.

11. The server device of claim 10, wherein the stateless microkernel is further configured to:

if the client attributes do not match a stored client attribute profile associated with an existing resource representation, then:
determine a user identifier associated with the HTTP request for the resource operation;
determine an action of the resource operation to be undertaken on the resource; query an authorization solver to determine whether the user is authorized to perform the requested action of the HTTP request on the resource;
if the resource operation is authorized, send the resource operation to a resource server associated with the resource, wherein the resource operation is a GET, POST, DELETE, PUT, SELF, or ADVISE operation and includes adding, retrieving, or deleting the resource from a file system or database, or programmatically generating the resource;
receive result of resource operation;
send the result of the resource operation to a linker for link processing; and
send the result of the resource operation to the splitter/combiner agent;
upon receiving a last result of the resource operation corresponding to a last of the one or more resource operations of the HTTP request at the splitter/combiner agent, combine each retrieved resource representation into a combined resource representation; and
send the combined resource representation to the requesting HTTP client program via the computer network.

12. The server device of claim 11, wherein the SELF operation includes a query of the resource for self entity data, the self entity data comprising resource URL, content type, max-age, entity-tag, and last modified data of the queried resource; and
upon a subsequent read operation, receive the self entity data from the queried resource.

13. The server device of claim 11, wherein the ADVISE operation includes sending a query for validity of the resource operation to the resource and, if the resource operation is not valid, receive from the resource an advice link indicating the not valid resource operation.

14. The server device of claim 13, wherein the resource upon receiving the ADVISE operation from the microkernel determines if the resource operation is valid; and
if the resource operation is not valid, generating an advice link advising the microkernel of the not valid resource operation and sending the advice link to the microkernel.

15. The server device of claim 10,
wherein the second application programming interface implementation layer is configured to be modifiable such that a modification of the second application programming interface implementation layer does not include a modification to the first application programming interface implementation layer.

16. The server device of claim 10, further comprising a publish/subscribe agent configured to:
receive a subscribe request for a specific resource from the HTTP client program;
monitor the resource for a change in state of the resource; and
upon the change in state of the resource, retrieve a modified representation of the resource, the modified representation of the resource indicating the change in state of the resource; and send the HTTP client program a modified representation of the resource.

17. A server device configured to execute a stateless microkernel architecture HTTP enterprise commerce server program, the server device comprising: a processor configured to execute:
- a plurality of resource servers, the plurality of resource servers including one or more local resource servers and one or more third party resource servers, wherein each of the plurality of resource servers provides a resource, the plurality of resource servers including one or more object servers and one or more link resource servers, and a stateless microkernel including a splitter/combiner agent, and a publish/subscribe agent;
- wherein the splitter/combiner agent comprises an application programming interface between the stateless microkernel architecture enterprise commerce server program and one or more third party resource server devices, wherein the splitter/combiner agent includes a first application programming interface implementation layer configured to interface with the stateless microkernel of the HTTP enterprise commerce server program and a second modifiable application programming interface implementation layer configured to interface with the one or more third party resource servers;
- wherein the second application programming interface implementation layer is configured to be modifiable such that a modification of the second application programming interface implementation layer does not include a modification to the first application programming interface implementation layer; and
- wherein the stateless microkernel including the splitter/combiner agent is configured to:
- receive an HTTP request including a plurality of client attributes and a plurality resource operations from an HTTP client program executed on a client computing device via a computer network, wherein each of the plurality of resource operations is performed on one of a plurality of resources; read the plurality of client attributes included in the HTTP request;
- at the splitter/combiner agent of the HTTP server program, split the HTTP request into a plurality of individual resource operations;
- for each of the plurality of individual resource operations:
- determine a destination URL;
- determine a content type at the destination URL from a content type header of the HTTP request;
- compare the client attributes to a stored client attribute profile;
- if the plurality of client attributes match a stored client attribute profile associated with an existing resource representation, then:
- retrieve the existing resource representation matching the plurality of client attributes retrieved from the HTTP request; and
- send the retrieved existing resource representation to the splitter/combiner agent;
- upon receiving a last retrieved resource representation corresponding to a last of the one or more resource operations of the HTTP request at the splitter/combiner agent, combine each retrieved resource representation into a combined resource representation; and
- send the combined resource representation to the requesting HTTP client program via the computer network.

18. The server device of claim 17, wherein the stateless microkernel including the splitter/combiner agent is further configured to:
- if the client attributes do not match a stored client attribute profile associated with an existing resource representation, then:
- determine a user identifier associated with the HTTP request for the resource operation;
- determine an action of the resource operation to be undertaken on the resource;
- query an authorization solver to determine whether the user is authorized to perform the requested action of the HTTP request on the resource;
- if the resource operation is authorized, send the resource operation to a resource server associated with the resource, wherein the resource operation is a GET, POST, DELETE, PUT, SELF, or ADVISE operation and includes adding, retrieving, or deleting the resource from a file system or database, or programmatically generating the resource; receive result of resource operation;
- send the result of the resource operation to a linker for link processing; and
- send the result of the resource operation to the splitter/combiner agent;
- upon receiving a last result of the resource operation corresponding to a last of the one or more resource operations of the HTTP request at the splitter/combiner agent, combine each retrieved resource representation into a combined resource representation; and
- send the combined resource representation to the requesting HTTP client program via the computer network.

19. The server device of claim 17, wherein the publish/subscribe agent is configured to:
- receive a subscribe request for a specific resource from the HTTP client program;
- monitor the resource for a change in state of the resource; and
- upon the change in state of the resource, retrieve a modified representation of the resource, the modified representation of the resource indicating the change in state of the resource; and
- send the HTTP client program a modified representation of the resource.

20. The server device of claim 17, wherein the ADVISE operation includes sending a query for validity of the resource operation to the resource and, if the resource operation is not valid, receive from the resource an advice link indicating the not valid resource operation.

* * * * *